United States Patent
Clements

(10) Patent No.: US 9,594,500 B2
(45) Date of Patent: Mar. 14, 2017

(54) TOUCH FREE HYGIENIC DISPLAY CONTROL PANEL FOR A SMART TOILET

(71) Applicant: Sigmund Lindsay Clements, Montreal (CA)

(72) Inventor: Sigmund Lindsay Clements, Montreal (CA)

( * ) Notice: Subject to any disclaimer, the term of this patent is extended or adjusted under 35 U.S.C. 154(b) by 804 days.

(21) Appl. No.: 13/927,111

(22) Filed: Jun. 26, 2013

(65) Prior Publication Data

US 2015/0000025 A1   Jan. 1, 2015

(51) Int. Cl.
| | |
|---|---|
| G06F 3/01 | (2006.01) |
| G06F 3/0488 | (2013.01) |
| G06F 3/0482 | (2013.01) |
| G06F 3/041 | (2006.01) |
| E03D 9/08 | (2006.01) |
| G06K 9/00 | (2006.01) |
| G06F 3/03 | (2006.01) |
| E03C 1/05 | (2006.01) |

(52) U.S. Cl.
CPC ............ *G06F 3/0488* (2013.01); *E03C 1/057* (2013.01); *E03D 9/08* (2013.01); *G06F 3/013* (2013.01); *G06F 3/017* (2013.01); *G06F 3/0304* (2013.01); *G06F 3/041* (2013.01); *G06F 3/0482* (2013.01); *G06F 3/04886* (2013.01); *G06K 9/00268* (2013.01); *G06F 2203/04108* (2013.01)

(58) Field of Classification Search
CPC .................................. E03D 9/08; G06F 3/013
See application file for complete search history.

(56) References Cited

U.S. PATENT DOCUMENTS

| | | | | |
|---|---|---|---|---|
| 4,946,271 | A | * 8/1990 | Palsgard | ................ G06F 3/013 351/209 |
| 5,307,524 | A | 5/1994 | Veal | |
| 6,317,717 | B1 | * 11/2001 | Lindsey | ................ E03C 1/055 137/559 |
| 7,636,956 | B1 | 12/2009 | Doucet | |
| 7,917,973 | B2 | 4/2011 | Baumoel | |
| 8,020,221 | B2 | 9/2011 | Bronchov | |
| 8,272,077 | B2 | * 9/2012 | Hashimoto | ............... E03D 9/08 4/420.4 |
| 9,383,914 | B2 | 7/2016 | clements | |
| 2013/0180041 | A1 | 7/2013 | Ding | |
| 2015/0000026 | A1 | 1/2015 | clements | |

FOREIGN PATENT DOCUMENTS

CN            201202168 Y        3/2009

* cited by examiner

*Primary Examiner* — Janie Loeppke

(57) ABSTRACT

A touch free toilet control panel display which may be used, for activating various components of a smart toilet. The user may touch freely use a touch free input device, for choosing from a displayed menu of toilet functions. Various input devices may used to activate the displayed toilet devices, such as, a floating capacitive field (404) to detect a user's fingers hovering above the displayed menu options (406), body movement recognition used to control the movement of a displayed cursor, an eye tracking system (604), that uses the user's gaze point (610), tongue recognition, etc. Touch free activation of the menu functions, reduces the transmission of bacteria from the menu panel to the user, and may also ease the use of the toilet devices. The display menu may show toilet devices, such as, a bidet, bidet water temperature, internet connection, etc. Other embodiments are described and shown.

16 Claims, 22 Drawing Sheets

TOUCH FREE HYGIENIC DISPLAY CONTROL PANEL FOR A SMART TOILET

CROSS REFERENCE TO RELATED APPLICATIONS

This application claims the benefit of provisional patent application Ser. No. 61/664,747 filed Jun. 27, 2012, provisional patent application Ser. No. 61/739,727, filed Dec. 20, 2012, provisional patent application Ser. No. 61/757,094 filed Jan. 26, 2013, provisional patent application Ser. No. 61/818,027, filed May, 1, 2013.

FEDERALLY SPONSORED

Not Applicable

SEQUENCE LISTING

None

BACKGROUND

Field of the Embodiments

This application relates to the technical field of toilet menu control panels used in the operations of a smart toilet, more specifically to an improved way to activate the toilet menu options control function buttons without physically contacting the menu button.

Background of the Embodiments

Toilet control panel device function activation buttons can become contaminated by germs, during user hand contact with the control buttons. The bacteria can travel from the panel buttons, and be transmitted to a person's hands, Hands may then spread the bacteria and viruses to the person's mouth, to other surfaces, to other people, and to food, thereby increasing the risk of food poisoning, and transfer of diseases. Many people don't like to touch buttons, that have bacteria on them. Toilet remote control touch buttons and touch display faces have the problem of accumulating germs.

Some people try to wrap toilet paper around their hand, before touching the control panel buttons, in an effort to try to put an anti-bacterial barrier between the buttons and their hand. The toilet paper barrier is ineffective since bacteria can easily travel through toilet paper. People may try to use a piece of clothing, such as a part of a shirt sleeve as a barrier between the button and the hand. The shirt sleeve may act as a barrier; thought bacteria can attach to the user's shirt sleeve. Disposable rubber gloves may be effective in using the buttons sanitarily, though people may not like to carry and use rubber gloves.

To raise or lower the toilet seat, some people try to use their foot or shoe; this has drawbacks, such as the possibility of losing one's balance and falling. It also requires a certain amount of skill, to stand on one leg, and use the other leg to position the seat.

Infrared seat lifting systems have been used to control toilet device operations. The iTouchless company and the Bottoms up company make infrareds non touch toilet seat and lid lifting systems. Though infrared systems have been used to activate the toilet seat and lid, they haven't been used to control he multitude of other toilet devices such as the bidet, bidet water temperature, and bottom air dryer. Infrared systems also may be limited to on or off operation of device functions. Infrared analog behavior may be difficult such as incrementally increasing the temperature of the bidet water spray on a scale of 1 to 10.

Several Satis toilets made by the Lixil Corporation of Tokyo, Japan, use a smart phone blue tooth connection to Satis smart toilet, to activate the various toilets' devices. Smart phone toilet icon buttons are used to control the toilet device functions. Physical touch is needed to activate the buttons. Thought a person could have their own private cell phone, the user still has to physically touch the buttons. The touching of the buttons may be a path way for bacterial transmission.

Wireless Bluetooth remote control, liquid crystal display panels are used to influence a toilet functions, such as a toilet remote control display and toilet made by the Kohler Company. The Brondell Company of San Francisco, Calif., uses a hand held remote control which uses an infrared connection to a smart toilet seat, to control the toilet seats functions.

A Samsung Galaxy 4 made be by the Samsung Company of Seoul, South Korea uses a touch free capacitive field to allow a user to hover above the display screen, and control the displayed pages by swiping their hand back and forth, which moves the pages back and forth. The user can also answer the phone by waving your hand over the screen. Air View allows a user to hover their finger over certain items on the phone display to get a displayed preview Smart Pause tracks the user's eyes and stops any video their watching, if you look away The Xperia sola from Sony includes Floating touch technology. Air Gestures: Refers to hand movements made above the phone's display, without coming into contact with the display that controls the phone. Common gestures include waving your hand over the display to skip a track or waving left and right to switch between open web pages in the browser. The technology makes it possible for the smartphone to detect a finger up to 20 mm above the screen Eye-tracking uses the camera to lock onto the motion of the eyes, following wherever they move. With it, the phone can perceive where the user is looking, and can respond to a set of behaviors; let's say a very intentional movement to scroll a Web page up and down, or a long, purposeful blink to click. The user can also answer the phone or skip a track just by waving your hand over the screen. Air View allows the user to hover their finger over certain items on the phone to get a preview. Smart Pause" tracks your face and stops any video you're watching if you look away. The Samsung Galaxy 4 smart phone uses a touch free capacitive field to allow a user to interact with the phone while hovering above the display screen.

Apple Company uses voice recognition called Siri for touch free verbal interaction with the iPhone smart phone. The Xbox connected to the Xbox Kinect made by the Microsoft Corporation of Redmond, Wash., uses skeletal mapping of a user, to interact touch freely with avatars on a television screen. The Tobii Corporation of Danderyd, Sweden uses eye tracking software and hardware to allow a user to touch freely control the interaction of a computer display. The Leap motion company of San Francisco, Calif. uses three dimensional (3D) user hand interaction employs touch free user interaction with displayed virtual devices.

Several types of hands free toilet seat rising and lowering devices have been proposed, for example, Baumoel in, U.S. Pat. No. 7,917,973 (2011) shows an infrared hands free system, for lifting and lowering a toilet seat. Mechanical force devices, such as, Borochov and Gitelis, U.S. Pat. No. 8,020,221 (2011) uses a pneumatic toilet seat lifting device, which uses foot force to activate the toilet seat lifting device.

The draw backs, with such a system, are a user needs to physically find the foot lever, and with their foot apply force. Veals, in U.S. Pat. No. 5,307,524 uses an electric switch to activate, the raising and lowering of a toilet seat, one disadvantage, is the user needs to locate the switch with their foot, and physically contact the switch.

Fuhuan Chen's Intelligent Toilet Seat with Voice Control System, bibliographical data Cn201202168 (Y)-2009-03-04, application number (CN) (y) CN20082370552U uses voice recognition to control a smart toilet. Though there is no user toilet control panel display, for the user to interact with the smart toilet. Kenneth R. Lindsey, Cynthia Kaelin, Christopher A. Cooper, Voice activated liquid management system U.S. Pat. No. 6,317,717 B1, publication date 13 Nov. 2001 use's voice recognition to control the water flow of toilet devices such, faucet, shower, toilet flush, etc. The voice recognition doesn't control toilet devices.

More toilet seat lifting devices are shown in the following patents. Title: Hands Free Toilet Seat System, U.S. Pat. No. 7,636,956, issue date 2009-12-29, assignee Doucet, Shery, hands free toilet seat, lifting and lowering systems, uses an infrared system. A disadvantage with infrared systems is that physical movements are needed, to control the system. Infrared systems may be inadvertently activated if a user gets too close to the infrared sensor. Though such toilet seat lifting devices have achieved considerable popularity, and commercial success, there has been a continuing need for improvement.

An anonymous author writing on the Wikipedia website, In an article titled, Japan Toilets, sub title Advanced Features "a toilet company is working, on a "Another recent innovation is intelligent sensors that detect someone standing in front of the toilet and initiate an automatic raising of the lid (if the person is facing away from the toilet) or the lid and seat together (if someone is facing the toilet)". The author doesn't elaborate on the kind of sensors used, or if a computer is used. There is a problem for the user if they are facing away from the toilet seat in visually judging the up adown position of the seat.

Defects of other devices, is that, physical presence movement is required near a sensor to operate them. Infrared sensor systems may activate movement of the toilet seat inadvertently. Infrared systems may be negatively affected by sun light Many of the touch panel toilet device function buttons heretofore known suffer from a number of disadvantages:

(a) Bacteria can be transferred from the menu buttons to the user's hands when they touch the control panel buttons to activate the toilet devices.

(b) It may be difficult for the user to access the area where are control panel is located, so they can touch the panels buttons.

(c) Physically challenged users may have a difficulty touching the control panel buttons.

(d) It may be difficult to clean and remove bacteria from mechanical buttons, the buttons are difficult to clean and bacteria may build up on the buttons.

Some advantages of a touch free display control panel are bacteria and viruses are unable to be transmitted to the user's hands. By limiting hand contact with the bacteria and viruses that are on the panel, flushing handle, seat and lid. The transmission of bacteria and viruses to the hands is substantially reduced. The touch free control panel lowers the amount of bacteria that is transmitted from the toilet seat to hands, which lowers the amount of bacteria that is transmitted to the user, by hands to mouth transmission. By lowering the quantity of bacteria on the user's hands, this limits the amount of bacteria traveling from hands to food. Touch free interaction limits the bacteria on hands which limits the amount of bacterial transmission from hands to other surfaces, and transmission from hands to other people. Touch free interaction lowers the cross contamination of bacteria and viruses, from toilet to other surfaces. Lowering the cross contamination of bacteria and viruses, from the control panel and toilet seat to the user's hands, lessens peoples exposure to food poisoning, and disease pathogens Service sectors that are highly concerned about hygiene, such as the food industry, restaurants, medical industry, hospitals, health works, may be interested in hands free toilet panels and toilet seats. Combining hands free toil seats, with washlet bidets that use water to clean a user's bottom, a warm air dryer to dry the user's bottom, greatly reduces the need to use toilet paper, which may reduce the amount of bacteria the user to may be in contact with.

Signs asking employees to wash their hand after going to the toilet, may be less pressing, since workers contact with control panel, seat, and flushing handle would be greatly reduced. Progress in toilet panel cleanliness increases people's psychical wellbeing, and mental wellbeing, by having a safer bathroom environment. Decreasing sickness caused by bacterial contamination increases productivity, and work space contentment. Physically challenged users can access the toilet control panel without having to touch the buttons.

There are many ways to touch freely interact with the toilet display control panel for example using, voice recognition, fingers hovering above the display in a capacitive field, eye tracking, etc., or a combination of the different touch free devices used together.

The touch free panel, can control toilet devices, such as, a lid positioning motor, a seat positioning motor, a heated seat, a bottom air dryer blower, a bidet front wash, a bidet back wash, a toilet flush device, a bidet wand forward and backward mover, a seat massage, an air purifier, a stop button, an internet connection, a music player, etc.

Advantages

The advantages of the touch free toilet control panel, include, without limitation, are an improved touch free toilet control panel. From the ensuing description, a number of advantages of some of the embodiments of the touch free toilet control display become evident.

(a) Bacteria or viruses aren't transferred to the user when the user touch freely activates the touch free toilet control panel menu icons (b) The non touch panel allows for easy interaction with the control panel for medically, mobility challenged users (c) The non touch panel may aid disabled users.

(d) The touch free user input systems may be more versatile, user friendly, simpler and easier to use, then other systems, they only needs non touch user input to operate.

(e) The toilet seat assembly reduces the need to bend over to position the seat, which may be helpful for disabled or elderly users.

(f) It may be fun and enjoyable to converse with the system, using voice recognition, through the microphone and speaker interface, listening to greetings, prompts, and talking with the system. This conversing, may lead to a positive bonding between the user and the apparatus.

(g) The touch free panel may lower interpersonal relationship tension, between users. To avoid touching the seat, users may ask other users to lower the seat after use. Being able to position the seat and lid using non touch input, removes the need for users to communicate their desired seat position to each other, thus reducing friction between users, and possibly creating a more harmonious environment.

(i) The user can touch freely access the internet, to allow for the timely import of information and data, which the user can visually and verbally access the internet and visually and aurally receive internet content. The display can show internet information, such as videos, videophone calls, internet TV (j) Voice recognition can operates the seat and lids movements voice recognition combined with the display can highlight and active displayed chosen toilet seat functions.

(k) A though control headset using a humans thoughts, can be used to activate displayed chosen toilet device functions.

(m) The user can touch freely leave video messages on the display for other users.

(n) The user's touch free body movements can highlight and activate displayed chosen toilet seat functions, such as, position of the seat and lid, and operate the system functions.

(o) The user's touch free eye movements can highlight and activate displayed chosen toilet seat functions.

(p) The user's touch free floating touch can highlight and activate displayed chosen toilet seat functions.

(q) The user's touch free body gestures can highlight and activate displayed chosen toilet seat functions, such as, position of the seat and lid, and operate the system functions.

(r) The user's touch free floating touch can highlight and activate displayed chosen toilet seat functions.

(s) The user's touch free three dimensional interactions with a displayed avatar, can highlight and activate displayed chosen toilet seat.

(t) The user's touch free floating touch can highlight and activate displayed chosen toilet seat functions.

Accordingly several advantages are to provide an improved hands free toilet control panel, as a means of providing a more sanitary, fun, and healthy experience, for a person. Still further advantages will become apparent from a study of the following description and the accompanying drawings. Various embodiments of touch free control panels allow a user to control the various toilet devices without touching the control panel display. The capabilities and functions of the touch free toilet control panel bring the future of sanitary bathroom practices and advances, to the present now.

SUMMARY

In accordance with the various embodiments of the touch free toilet control panel display, that allows a user to interact with the control panel without touching the panel. The touch free interaction reduces or eliminates the transference of bacteria from the panel to the user's hands. The reduction of transferred bacteria to the hands may increase the health and wellbeing of the user.

DRAWINGS

Figures

Figure 12:
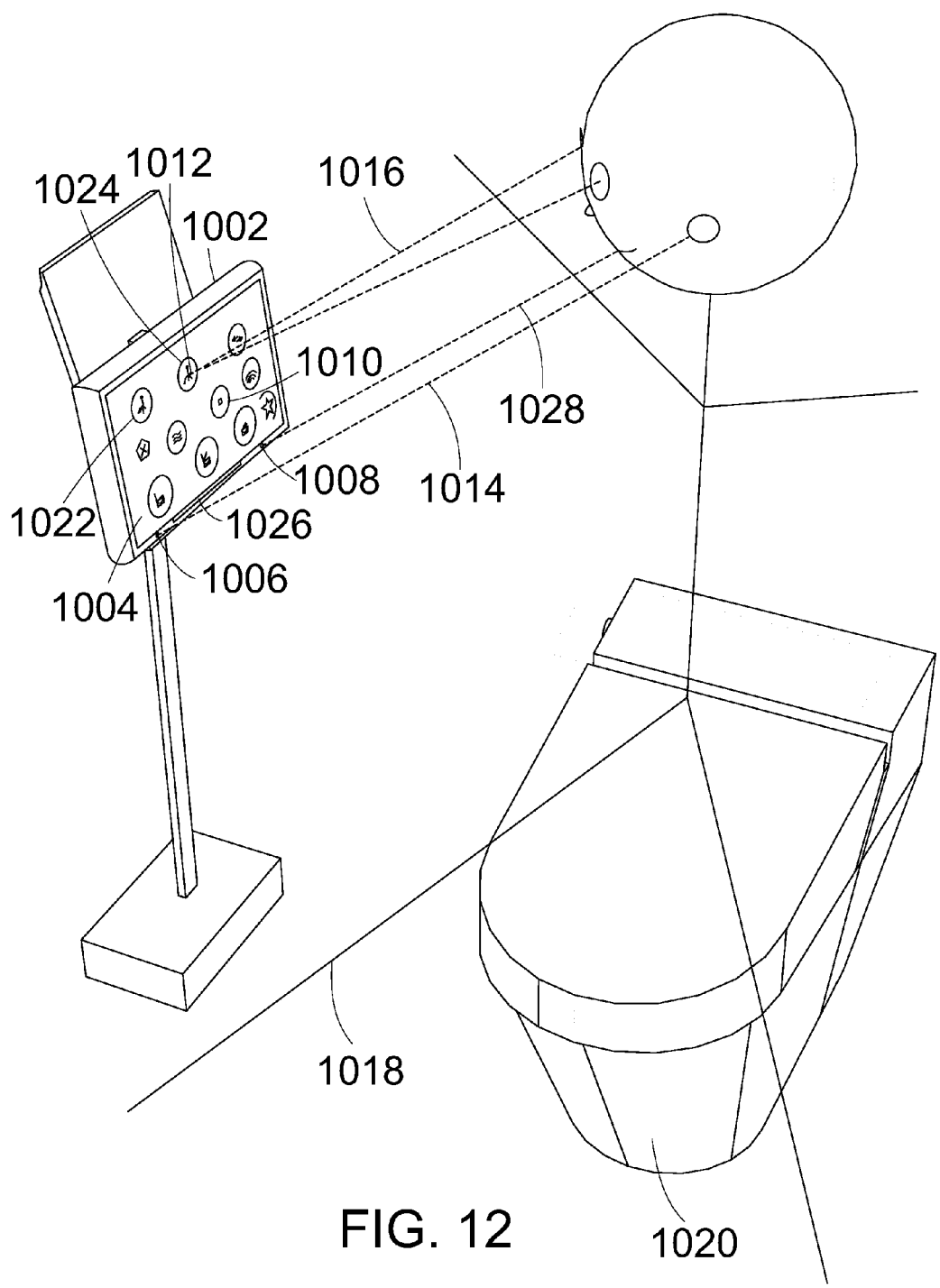
Figure 13:
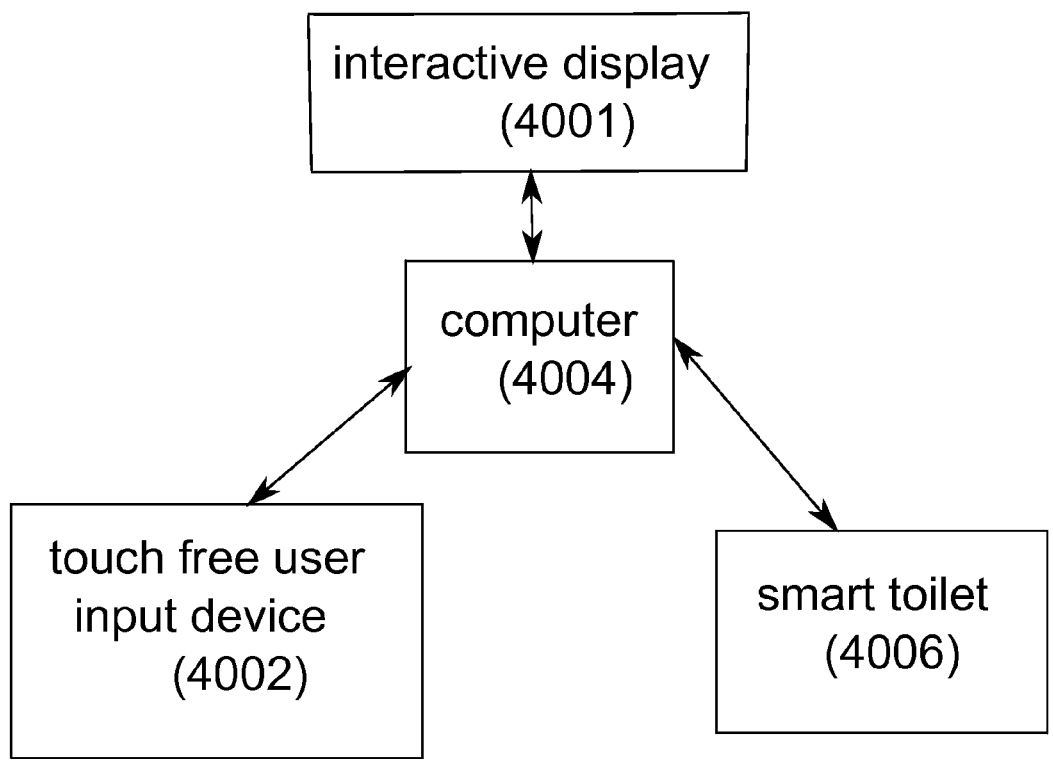
Figure 14A:
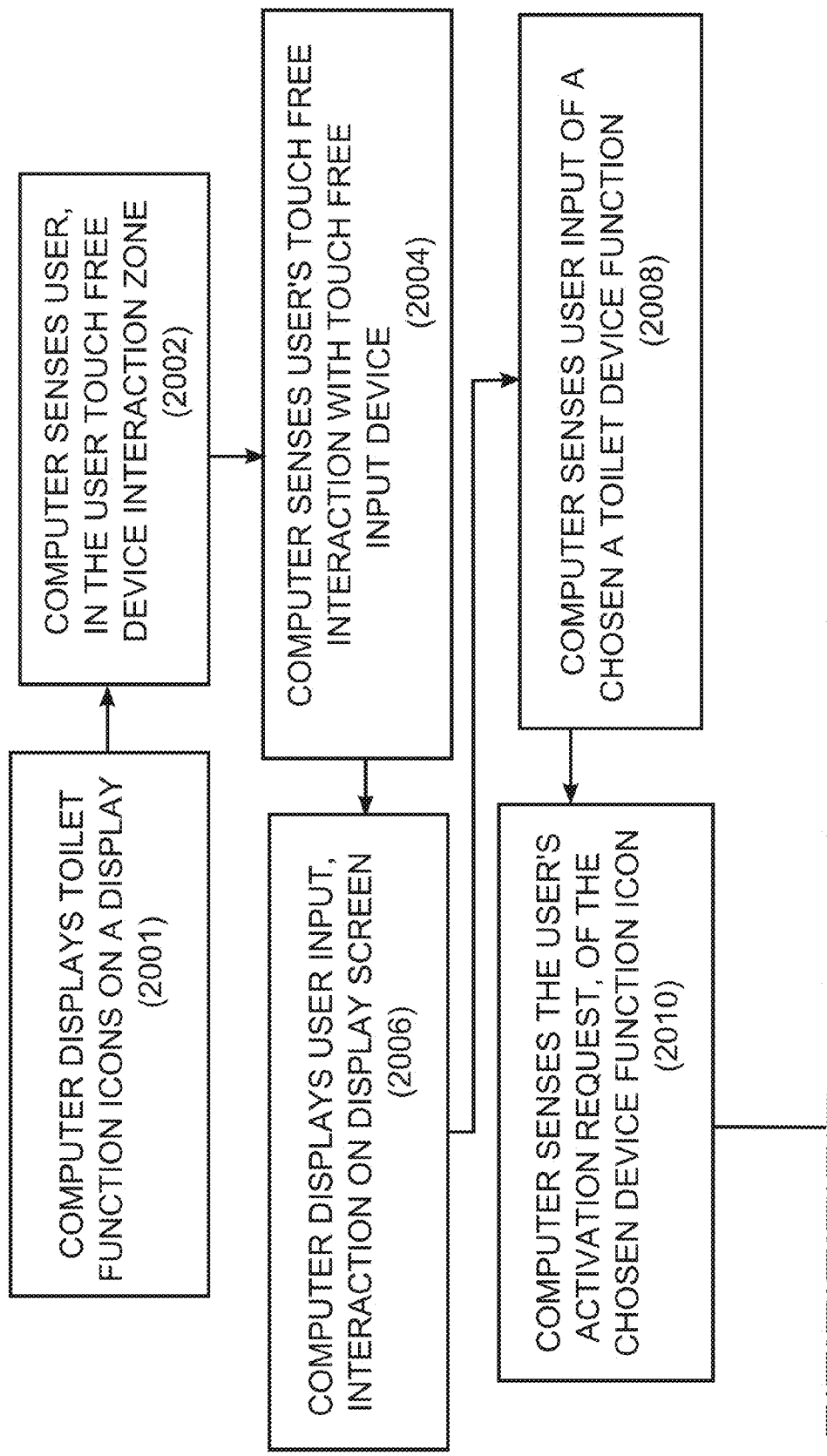
Figure 14B:
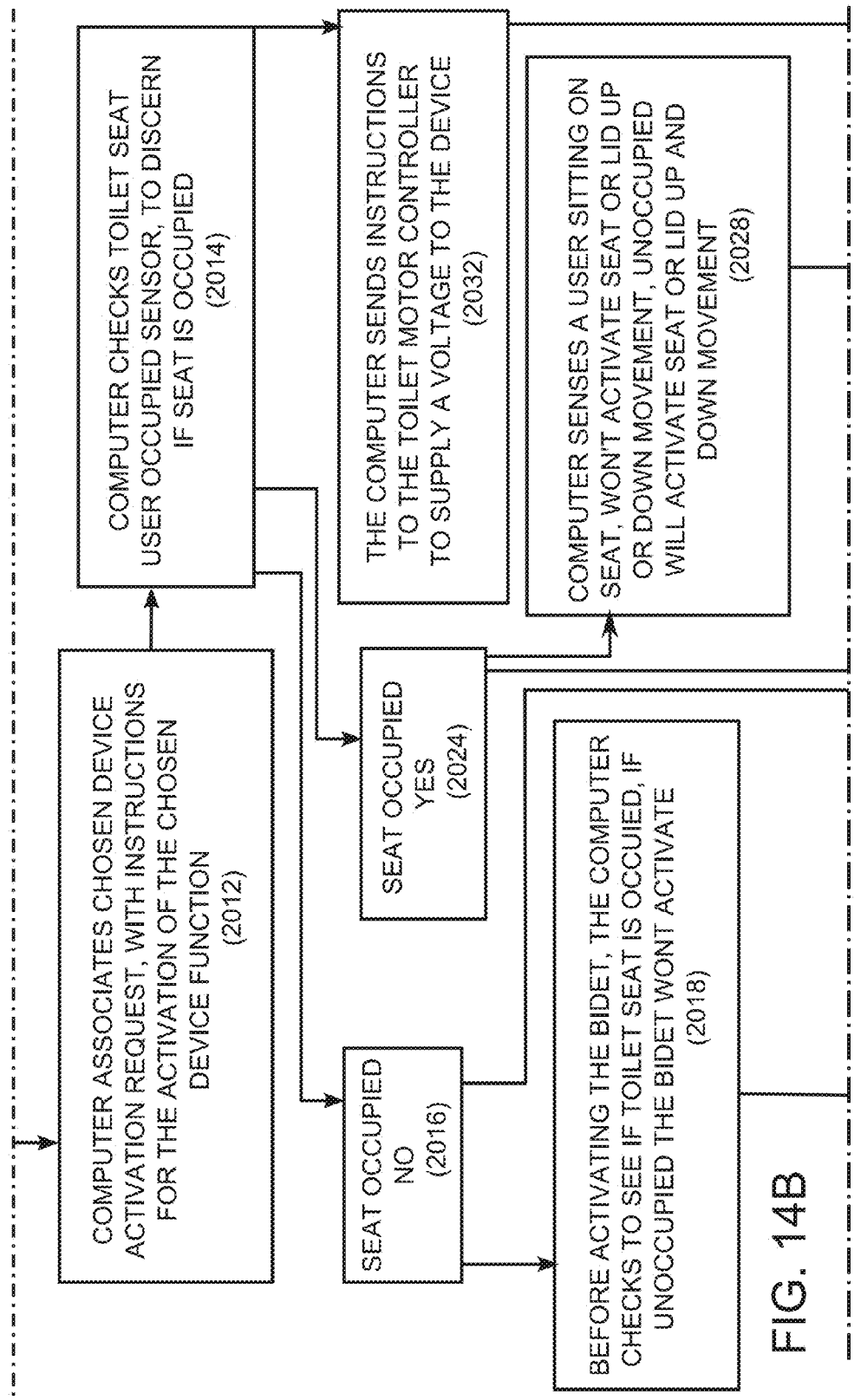
Figure 14C:
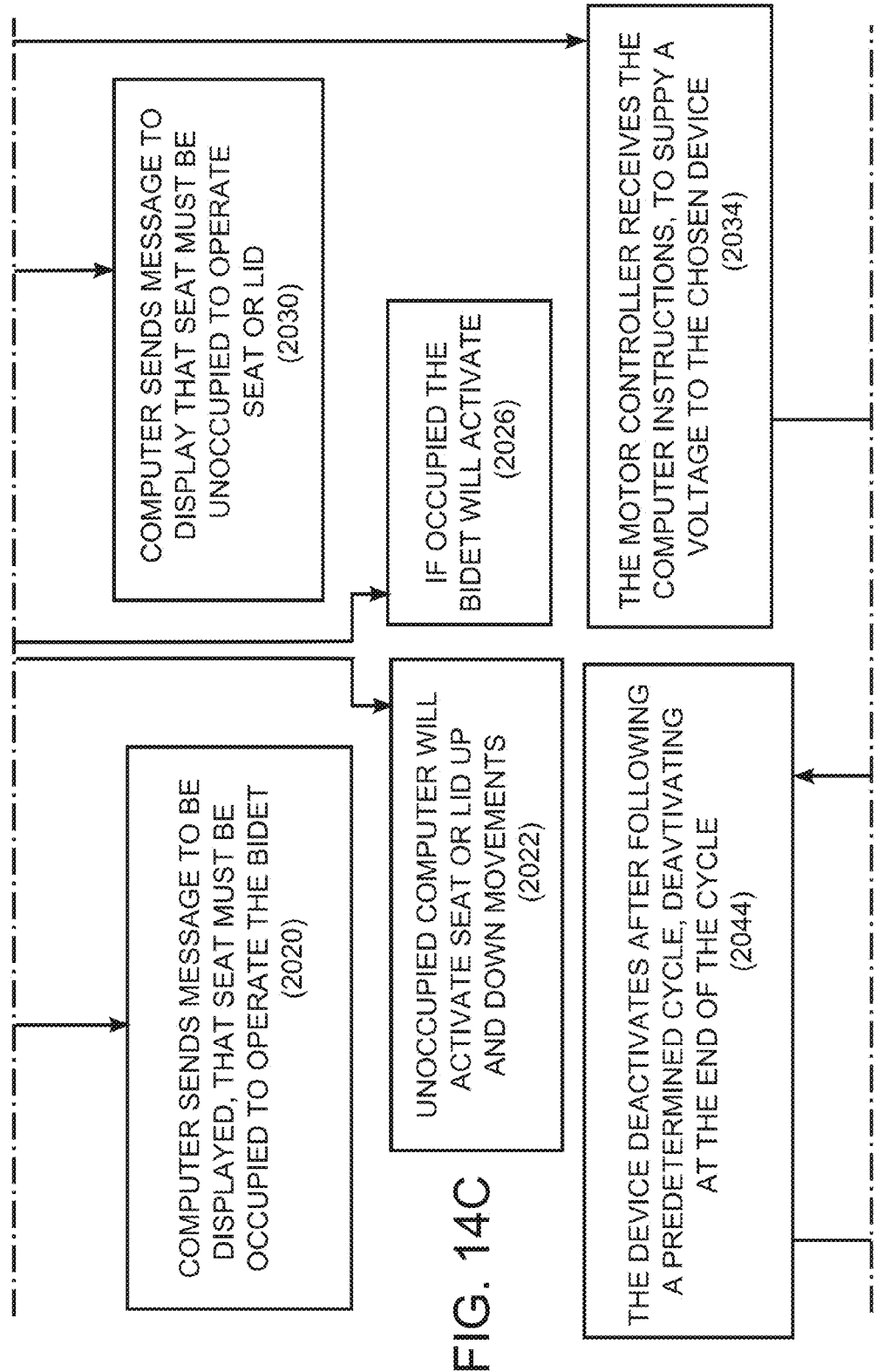
Figure 14D:
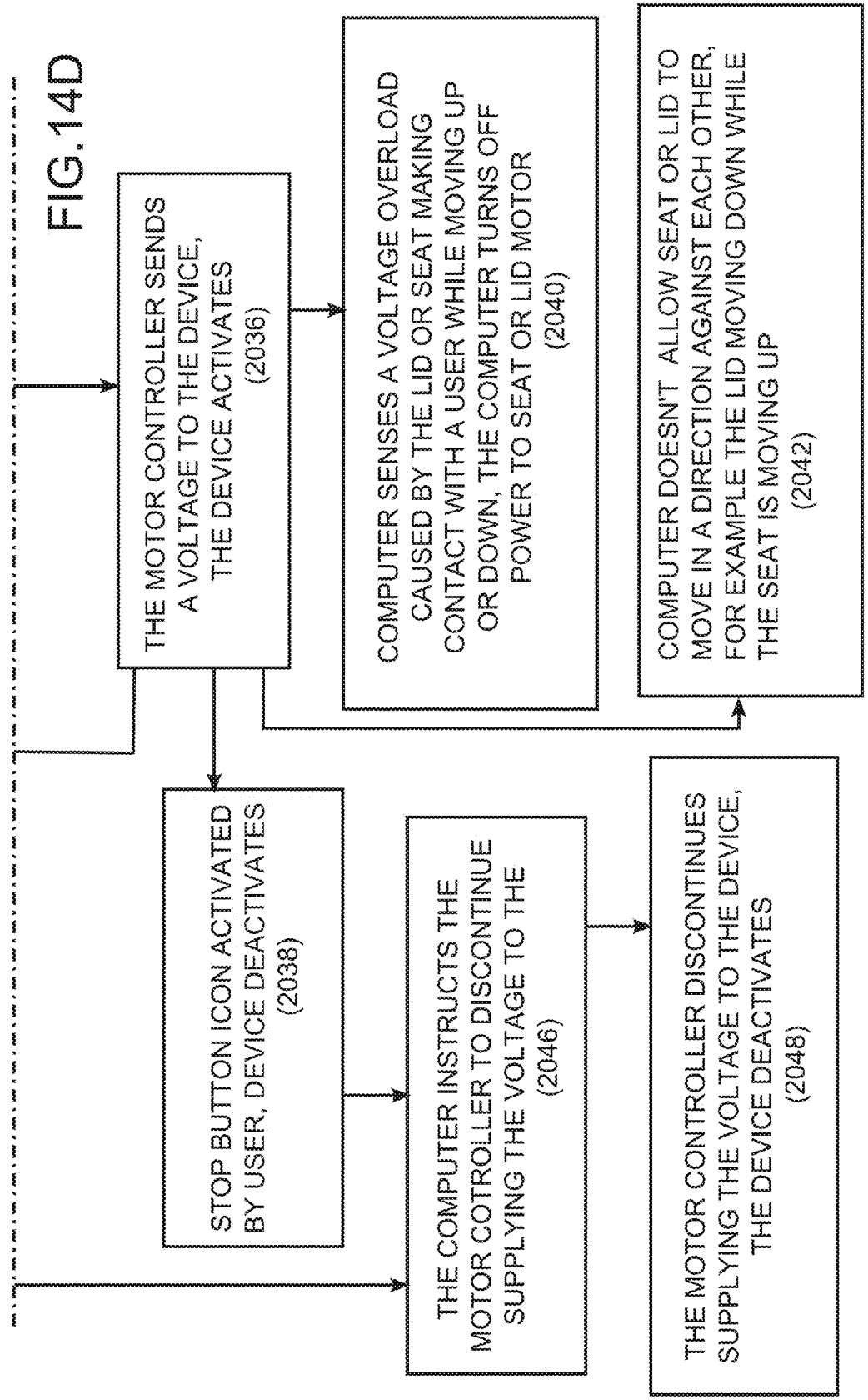

FIG. 12 front top right side perspective view of the Nuance voice recognition and the Tobii eye tracking display, connected to the smart toilet FIG. 13 is a flow chart of the computer, touch free device, display and toilet connections.

FIGS. 14*a*, 14*b*, 14*c* and 14*d* are a software flow chart of the computer, touch free device, display and toilet inter connections.

Figure 15A:
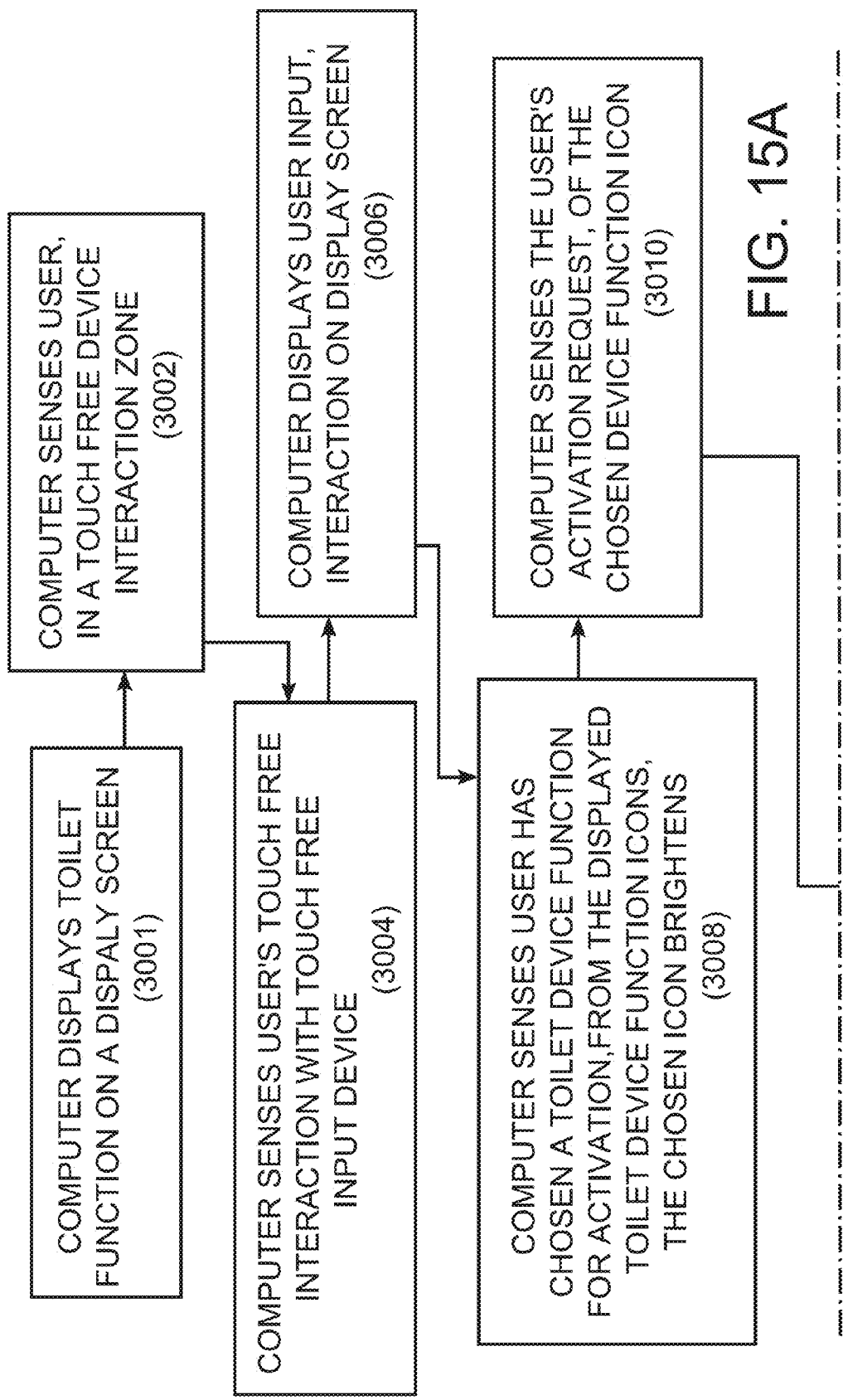
Figure 15B:
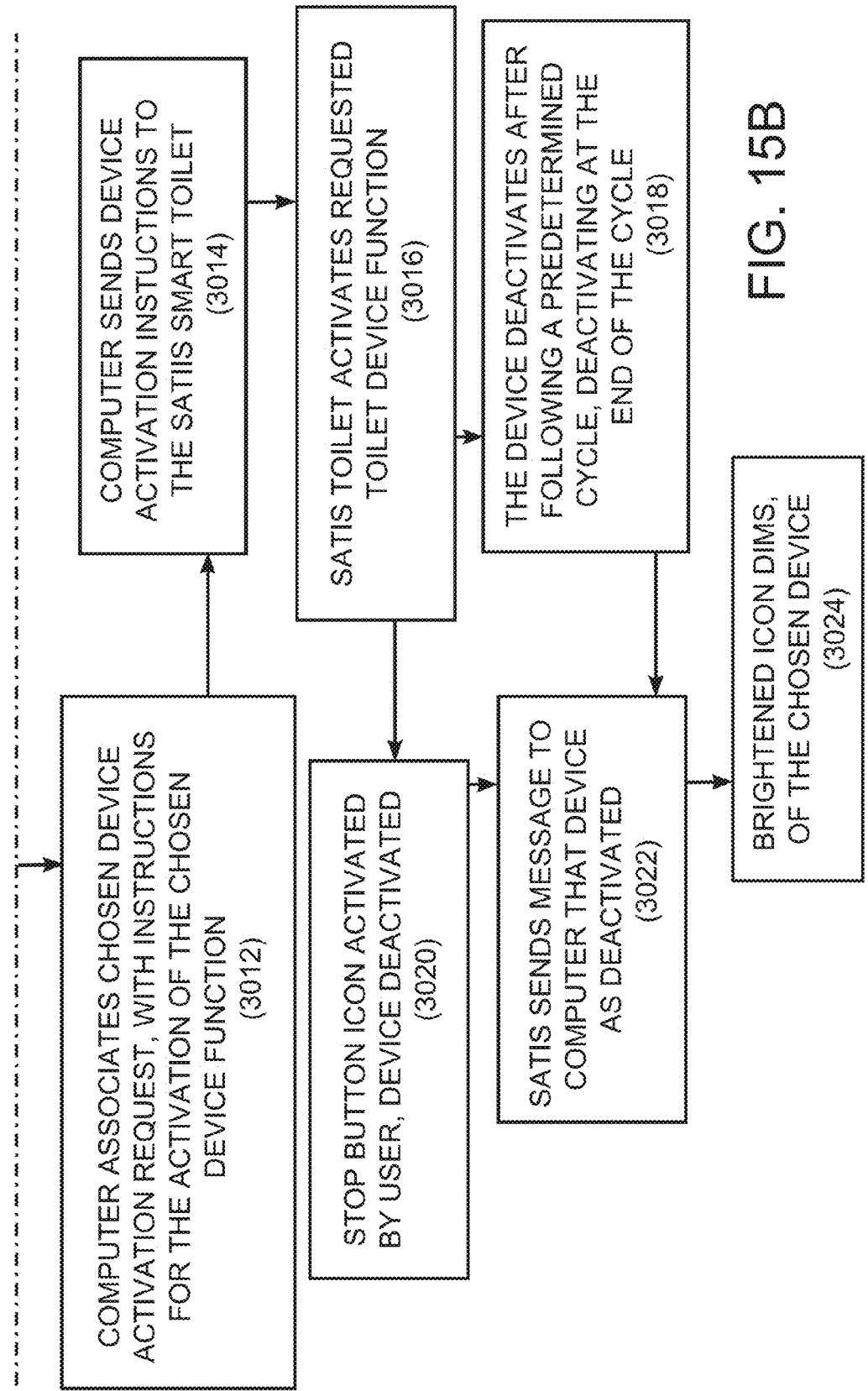

FIGS. 15*a*, and 15*b*, are a software flow chart of the computer, touch free devices, display and Satis smart toilet connections.

Figure 16:
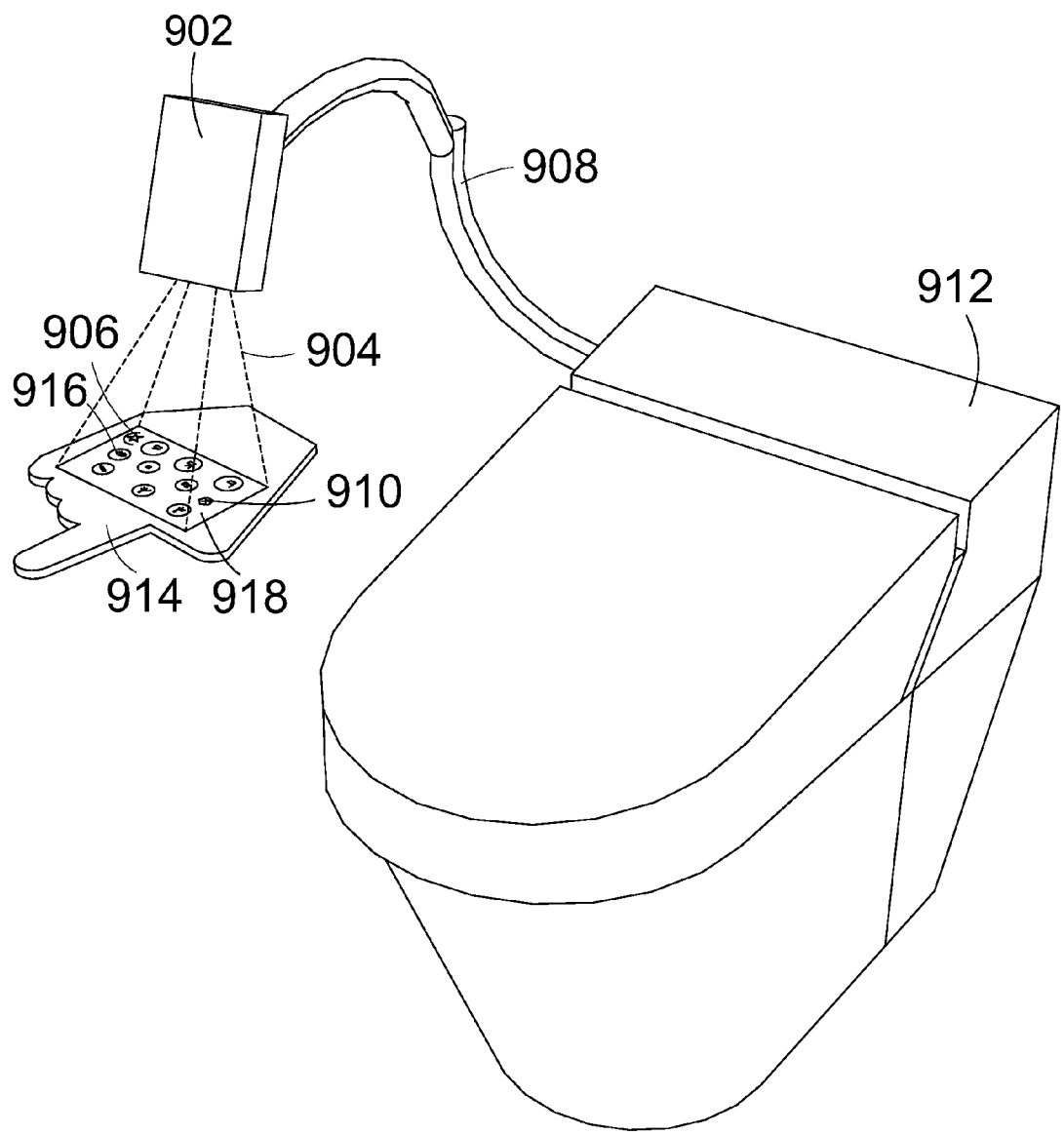

FIG. 16 is a front top right side perspective view of a Pico projector touch interactive projector, projection display on a user hand; and the smart toilet.

Figure 17:
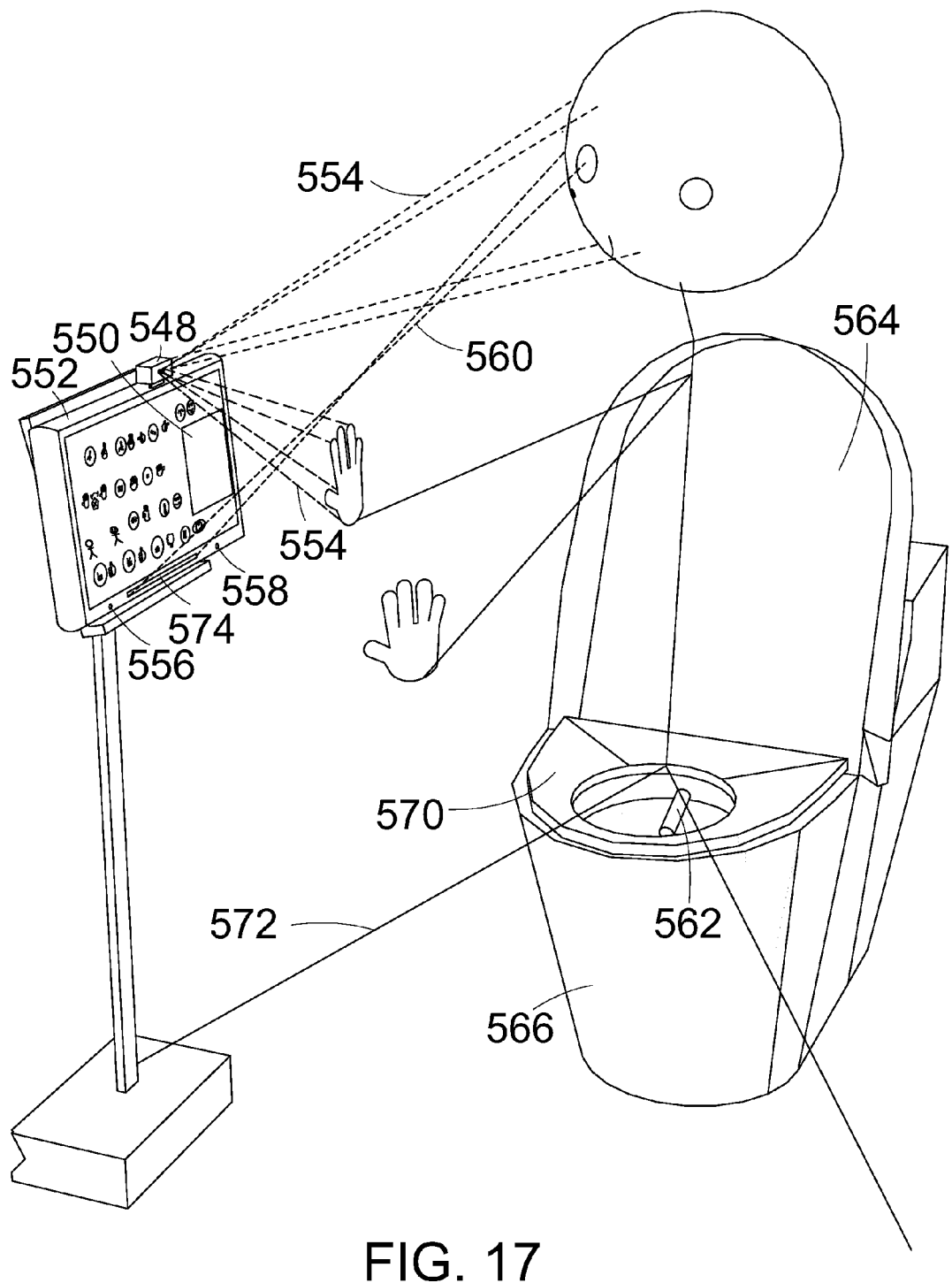

FIG. 17 is a front top right side perspective view of a Intel gesture touch free interactive display, and the smart toilet.

Figure 18:
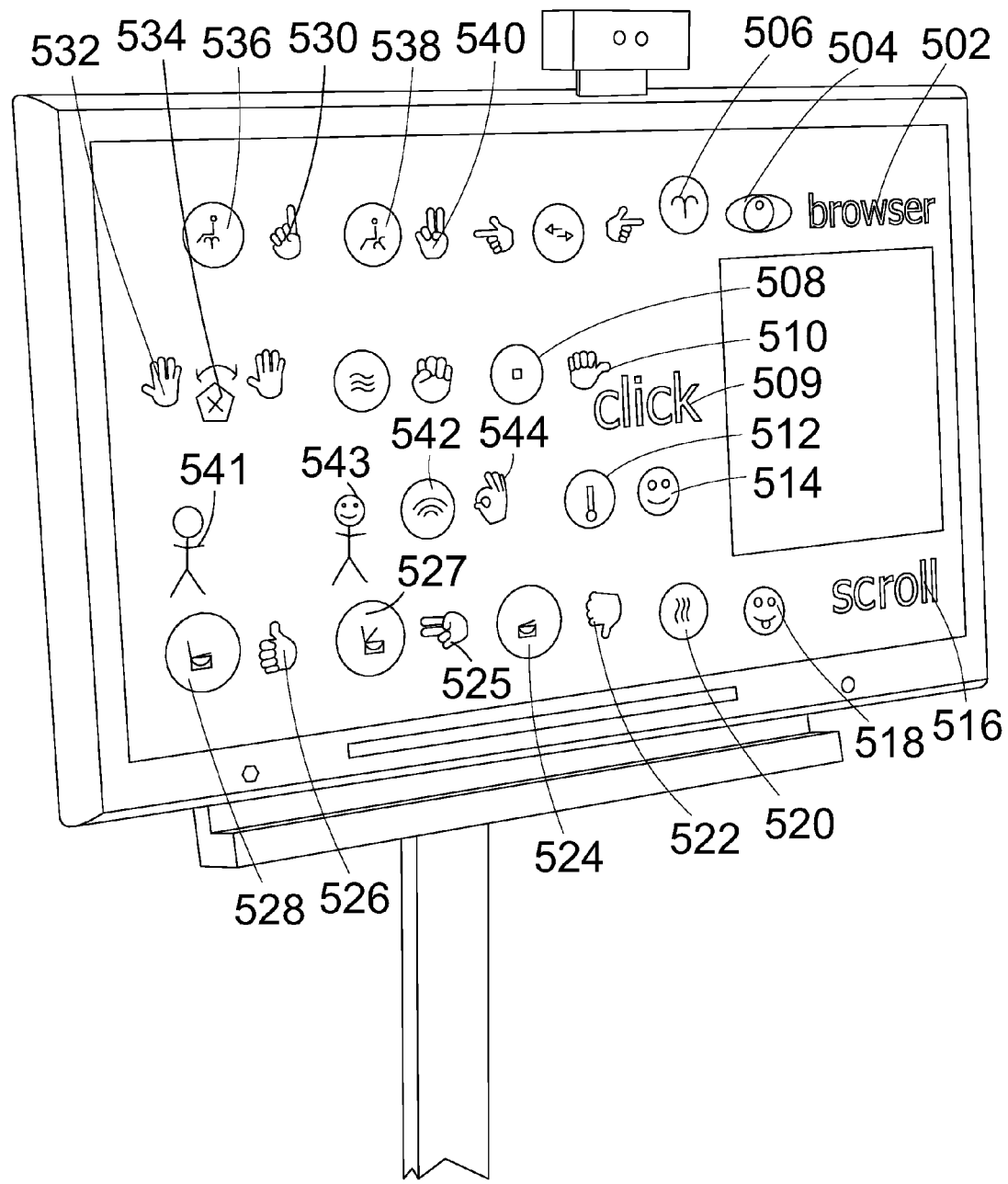

FIG. 18 is a front left side perspective view of the Intel gesture touch free interactive display.

DRAWINGS REFERENCE NUMERALS

102 Kinect sensor evoluce
104 LCD display evoluce
106 Sony all in one computer evoluce
108 smart toilet evoluce
110 toilet seat evoluce
111 camera automatic bidet evoluce
112 bidet wand mover evoluce
114 stop button evoluce
116 internet connection evoluce
118 seat and lid closed evoluce
120 seat and lid up position evoluce
122 lid up evoluce
124 air dryer bottom evoluce
123 profile activation icon evoluce
125 microphone evoluce
126 front wash evoluce
127 speaker evoluce
128 back wash evoluce
129 display face evoluce
130 display wire alternating current evoluce
132 computer connection to toilet motor controller evoluce
134 Sony computer wire alternating current evoluce
136 toilet motor evoluce
138 bidet manual and automatic evoluce
140 display to computer wire connection evoluce 142 wall evoluce
144 user controlled hand avatar cursor evoluce
146 avatar hand visual activation timer evoluce
150 lid evoluce
152 user interaction zone evoluce
154 toilet alternating current wire connection evoluce
156 lid motor evoluce
202 Samsung tablet computer Fogale
204 user interaction zone Fogale
206 display face Fogale
208 lid up Fogale
210 stand Fogale
212 Satis smart toilet Fogale
214 seat Fogale
216 lid Fogale
302 Leap motion control pad leap
304 user interaction zone leap
306 Dell all in one computer leap
308 display face leap
310 bidet leap
312 toilet leap
314 lid leap
402 Nexus smart phone STMicroelectronics
404 user interaction STMicroelectronics
406 display face Nexus smart phone STMicroelectronics
408 phone holder STMicroelectronics
410 bidet STMicroelectronics
412 Satis smart toilet STMicroelectronics
414 toilet seat STMicroelectronics
416 lid STMicroelectronics
420 lid up STMicroelectronics
422 stop button STMicroelectronics
424 front wash STMicroelectronics
426 internet connection STMicroelectronics
502 illuminated browser
504 move eye up or down icon
506 increase or decrease bidet water spray pressure icon
508 The user activates the stop button
510 hand in a fist with thumb sticking out icon
512 toilet seat warmer
518 smiley face up icon
520 bottom air dryer icon
522 following the fist with thumb down icon
524 lid down icon
525 two fingers pointed out horizontally icon
526 fist with thumb up icon
527 seat up icon
528 lid up icon
530 one finger up icon
532 hand back and forth movement icon
534 seat following icon
536 front wash bidet icon
538 back wash bidet icon
540 two finger up icon
541 user back gesture
542 internet activation icon
543 user front gesture
544 thumb and index finger making a circle hand sign icon
548 camera
550 display
552 computer
554 user gesture interaction zone
556 microphone
558 speaker
560 user eye interaction zone
562 bidet
564 lid
566 toilet
570 seat
572 user
602 Acer all in one computer Tobii
604 Tobii sensors Tobii
606 bidet wand back and forth mover Tobii
608 bidet Tobii
610 eye gaze point Tobii
612 user interaction zone Tobii
614 user Tobii
618 display of computer Tobii
620 Satis smart toilet Tobii
622 internet connection Tobii
624 bottom air dryer Tobii
702 levitation toilet levitation
704 levitating plasma generator levitation
706 levitating plasma deliverer levitation
708 levitating plasma levitation
710 bidet levitation
712 user levitation
802 Apple all-in-one computer nuance
804 display nuance
806 back wash bidet nuance
808 bidet nuance
810 Satis smart toilet nuance
812 user nuance
814 interactive vocal pathway nuance
816 interactive hearing pathway nuance
818 speaker nuance
820 microphone nuance
822 stop button nuance
902 Pico projector hand projection
904 projection zone hand projection
906 internet connection icon hand projection
908 flexible support hose hand projection
910 stop button icon hand projection
912 Satis smart toilet hand projection
914 hand projection hand projection
916 bottom dryer icon bottom hand projection
918 project device function menu hand projection
1002 Hewlet Packard all in one computer nuance and Tobii
1004 display nuance and Tobii
1006 speaker nuance and Tobi±
1008 microphone nuance and Tobii
1010 stop button nuance and Tobii
1012 gaze point nuance and Tobii
1014 interactive hearing pathway nuance and Tobii
1016 interactive vocal pathway nuance and Tobii
1018 user nuance and Tobii
1020 Satis smart toilet nuance and Tobii
1024 back wash nuance and Tobii
1026 Tobii sensors nuance and Tobii
1028 verbal speaking pathway Tobii
1202 projector Pico
1204 projected display Pico
1206 wall Pico
1208 housing Pico
1210 assembly Pico
1212 Kinect sensor Pico
1214 lid Pico
1216 seat Pico
1218 support hose Pico

DETAILED DESCRIPTION

Figure 1:
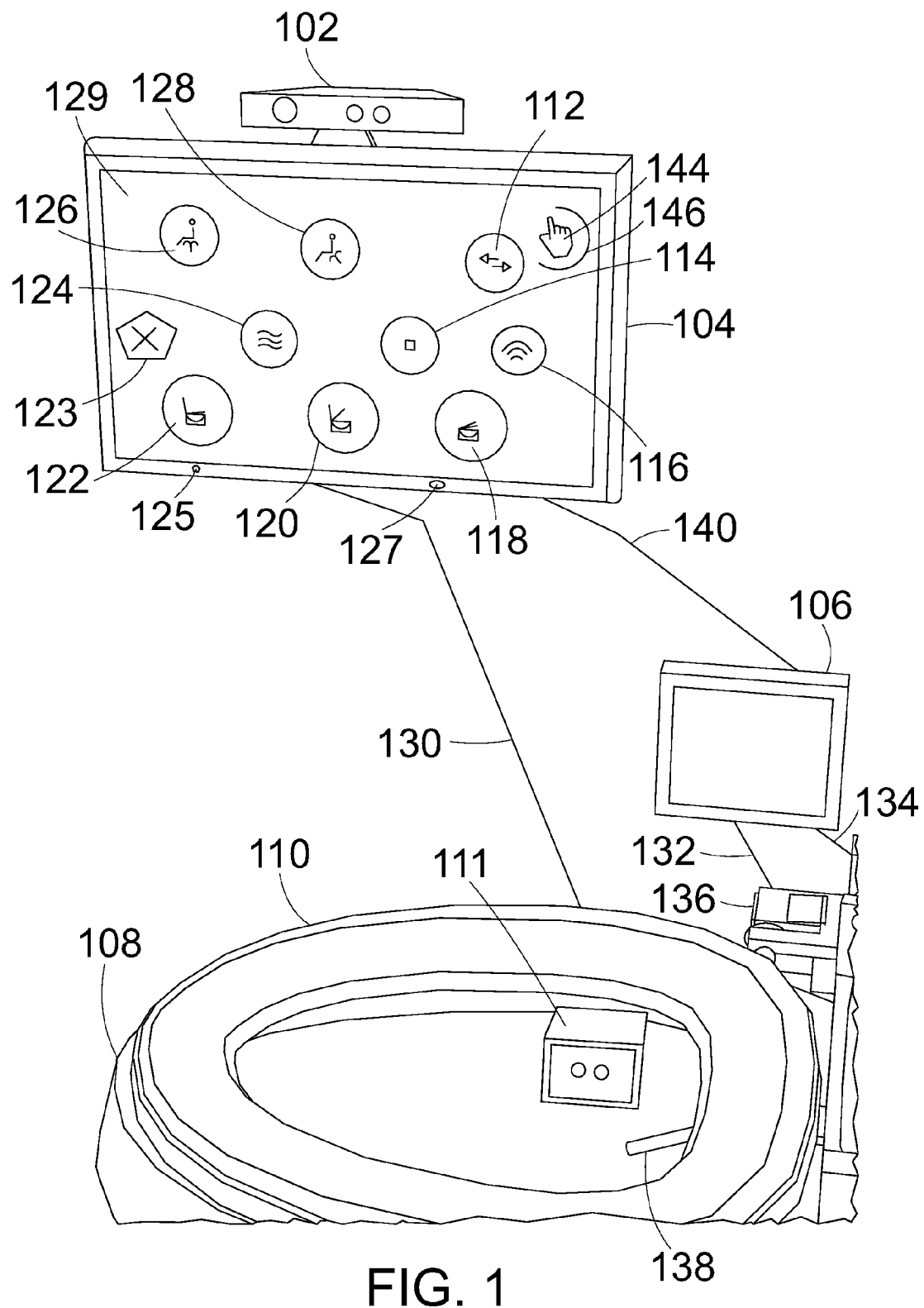
FIG. 1 is a top front perspective view of an Evoluce body motion controlled avatar touch free interactive display, and the toilet with a manual and automatic bidet.
Figure 2:
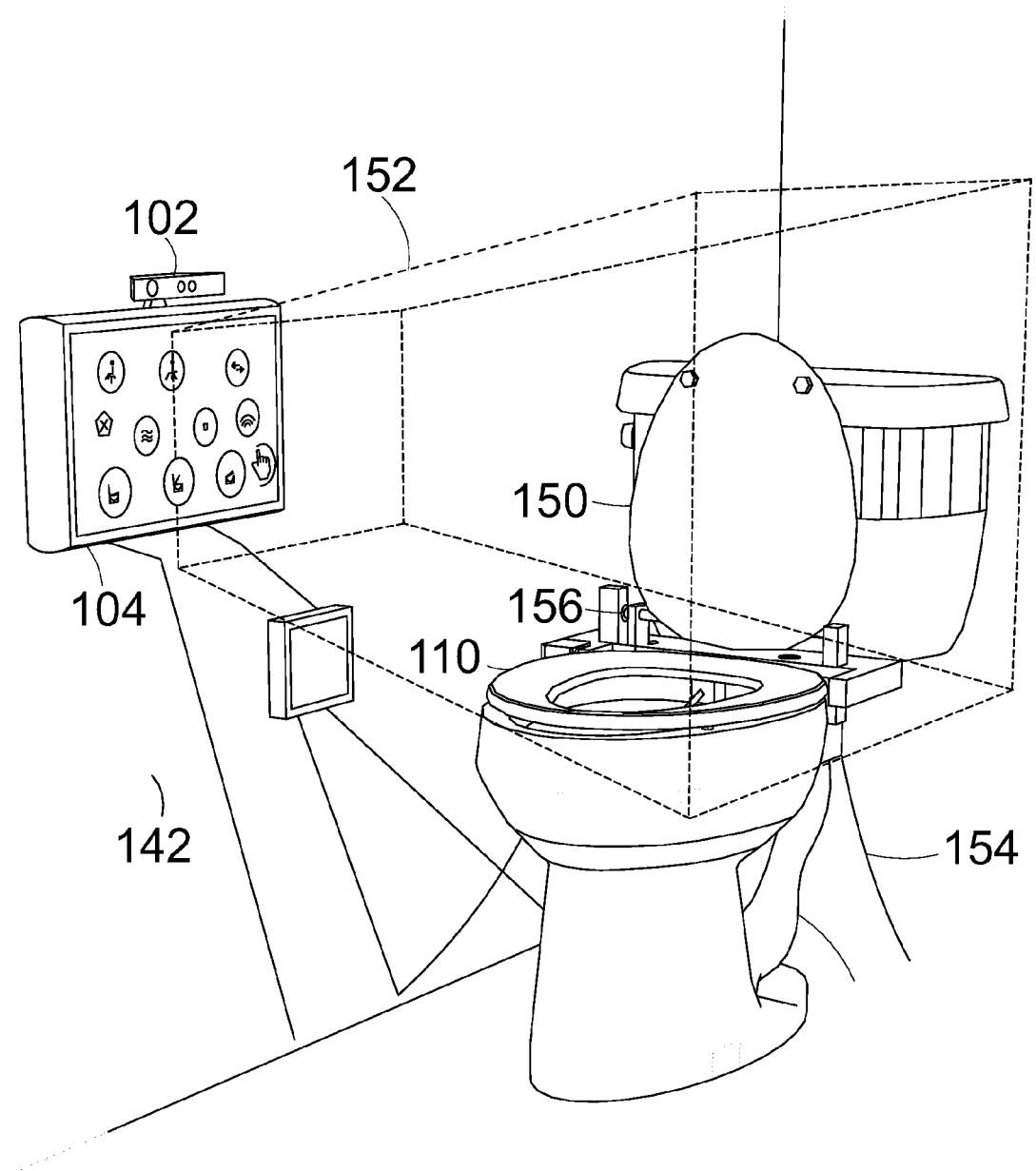
FIG. 2 is a front right side perspective view of the Evoluce body motion controlled avatar touch free interactive display, and the toilet.

FIGS. 1 and 2 First Embodiment

Wall Display Evoluce Description

A Kinect sensor 102, in FIGS. 1 and 2, made by the Microsoft Company, of Redmond Wash., USA, is connected to a Sony all in one computer 106, and generates real-time depth, color and audio data of the scene in front of a Liquid Crystal Display LCD display 104, the display 104 could also be a plasma display. The Kinect 102 does not require a user to wear or hold anything and does not require calibration.

The Kinect sensor 102 attaches to a Sony display 104. The display 104 attaches to a wall 142 or stand. The display 104 connects to the computer 106, by wire 140 but could also use a Bluetooth wireless connection. The Kinect user interaction zone, optimal range 152 of use is 0.8 to 3.5 meters from the Kinect sensor. The Sony computer 106 connects to the toilet motor controller (not shown), by wire 132. The computer 106 and motor controller could also use Bluetooth radio waves, using Bluetooth transmitters and receivers in the computer 106 and to Bluetooth transmitters and receivers connected to the motor controller. The computer and motor controller, could use a WiFi area connection to connect to each other, with WIFI transmitters and receivers in the Sony 106 and the toilet motor controller (not shown). The motor controller connects to a bidet 138, seat servo motor 136 and to a lid servo motor 156, etc. by wire. The bidet 138 can be operated manually, with the user inputting the bidet's operating settings, or automatically by identifying the user's gender. The Intel camera 111 in the toilet bowl 108 area may identify a user's gender. With the user's gender identified and the user's evacuation process monitored, the bidet 138 can start a wash cycle, which is specific to the user.

Evoluce software made by Evoluce Ag of Bunch am Erlbach, Germany, is programmed into the Sony computer 106. Evoluce software 106 works with Kinect for Windows software 106 which is programmed in the computer 106, the software empowers personal computers PCs with natural interaction capabilities. Kinect for windows software developers' kit maybe used to program the system. Microsoft windows 7 or windows 8 software can be used. Evoluce software may be used to program the system.

The processors may be any conventional processor, such as processors from Intel Corporation or Advanced Micro Devices. The Sony 106 can be programmed with an Apple Nokia S40 operating system, Blackberry, Qualcomm, Linux or Microsoft's operating system software.

The Sony 106 connects to the internet (not shown) using a WIFI connection, and by activating the internet icon button 116. The WIFI receiver is incorporated within the computer 106. The Sony liquid crystal display 104 can show internet content, such as internet videos. With a speaker 127 and microphone 125 incorporated within the display 104 the user can make internet video calls. The user can search the internet by interacting with the Evoluce software 106, Kinect 102 and the display 104. The user can surf the internet, view internet web pages, watch internet TV, watch cable TV, view internet content and view and listen to internet videos. The user can search the internet with the results displayed on the display face 129. Internet search engine results can be displayed 104. Search engines such as Google, Yahoo, or Safari etc., can be used. The user may verbally chat with people, using the internet connection. The user may leave video messages on the display 104 for other users to access, activate and view.

An alternating current supplies power to the smart toilet 108 by a wire connection 154, to the display 104 by a wire connection 130, to the computer 106 by a wire connection 134, and to the Kinect 102 by a wire connection (not shown). The toilet 108, display 104, Kinect 102 and computer 106 could also be powered by a direct current battery (not shown). A warm dry air blower (not show) blows warm dry air on the display screen 104, to reduce fogging of the screen 104. The screen 104 senses when the screen 104, may be fogging, and automatically turns the screen defogger on.

For safety the system motors 136, 156, turn off, if a voltage overload is detected. The voltage overload may be caused, by a user contacting the moving seat 110 or lid 150 while they are moving. A slip clutch (not shown) between the motor and the part being moved, such as moving the seat 110 or lid 150 up or down, limits to a safe level the amount of force applied to a user, contacting the moving part. The motor or motors are turned off, when shaft rotation sensors (not shown) detect, when the seat 110 and lid 150 have reached their up or down position. The Sony 106 signals the motor controller to supply a voltage, to the motors or motor, to move the seat motor 136 and lid 156 motor clockwise or counter clockwise, which raises or lowers the seat 110 and or lid 150.

The touch free user input device means, is the Kinect sensor 102. The touch free user input device software means, is the Evoluce Multi-touch & Gesture software, Evoluce Win&I software, image and Video Viewer for Kinect for Window 106, and Microsoft operating system software 106, and Kinect for windows software 106.

Devices like the Microsoft Kinect for Windows sensor 102 can either sit on top of or next to a screen 104 or a monitor 104. The Kinect for Windows sensor 102 is body movement recognition hardware, connected to the Sony PC 106 by the USB. The avatar is controlled by the user's body movement system. The Kinect sensor 102 and display 104 face the toilet area, and collect data about the scene if front of the sensor.

Kinect software 106 is programmed in the computer 106. A Microsoft operating system software window 7 or 8 106 is programmed into the computer 106. Evoluce Multi-touch & Gesture software, volume Win&I software, image and Video Viewer for Kinect for Window, media Viewer for Kinect for Window and PowerPoint Presenter for Kinect for Windows software application 106 is programmed in the computer 106.

The computer 106 is connected to the motor controller, by wire. The computer 106 is power by a powered by a connection to alternating electrical current and the motor controller is powered by a connection to an alternating current. The motor controller supplies power to the toilet electrical components, by wire. The Evoluce display 104 is powered and connected to an alternating power supply.

The display 104 shows toilet functions icons, such as, lid up 122, seat up 120, seat down 122, seat and lid down 118, a user profile activation icon 123, bottom air dryer blower icon 124, bidet front wash activate icon 126, bidet back wash activation icon 128, bidet wand forward and backward movement icon 112, stop button icon 114, internet connection to computer activation icon 116. Other toilet functions could be displayed such as, a bidet water aerator, a air deodorizer, a air filter, a air negative ion generator, a automatic toilet flushing device, a toilet seat massager, a anti-bacterial ultraviolet light, a recorded sound playing system, a bidet water pressuriser, etc.

The Kinect for Windows software developer's kit or Microsoft Robotics Developers Kit can be used to program the computer 106 for the Kinect sensor 102. An Intel perceptual computing software developer's kit could be used to build applications for the smart toilet applications. The Microsoft Software Developers Kit can be used build smart toilet function applications.

Various programming languages can used to program the computer 106 such as C++, C#, and Microsoft Visual Studio Ultimate, FAAST key mapping software, Microsoft Visual Programming Language, Microsoft NET 4.0 XNA 4.0, Silverlight 4.0, and Visual Basic.NET. This Software Developer's Kit allows developers to write Kinect applications in C++/CLI, C#, Microsoft Visual Programming Language, or Visual Basic .NET.

The Microsoft Robotics Developers Studio application contains a graphical environment, Microsoft Visual Programming Language: (VPL) command line tools which may allow a developer to deal with Visual Studio projects (VS Express version) by possibly using C#, and 3D simulation tools.

The computer 106 may be programmed using, the Microsoft windows commercial software development kit, or Linux operating system, or Android operating system. Or Blackberry operating system, or apple operating system.

Computer program code for carrying out operations of the object detection and selection mechanism may be written in any combination of one or more programming languages, including an object oriented programming language such as Java, Smalltalk, C++ or the like and conventional procedural programming languages, such as the "C" programming language or similar programming languages. The program code may execute entirely on the computer, partly on the computer, as a stand-alone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider).

The object detection and selection mechanism is described below with reference to flowchart illustrations and or block diagrams of methods, apparatus (systems) and computer program products according to implementations thereof. It will be understood that each block of the flowchart illustrations, FIGS. 13, 14a, 14b, 14c, 14d, 15a and 15b, and or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function act specified in the flowchart and or block diagram block or blocks.

The computer program instructions may also be loaded onto a computer or other programmable data processing apparatus to cause a series of operational steps to be performed on the computer 106 or other programmable apparatus to produce a computer implemented process such that the instructions which execute on the computer 106 or other programmable apparatus provide processes for implementing the functions or acts specified in the flowchart and or block diagram block or blocks.

A flowchart of the touch free toilet display control panel operation illustrated in FIGS. 14a, 14b, 14c and 14d., may include some of the following steps, step (a) the computer displays toilet function icons on a display screen 2001, (b) computer senses user, in the user non touch device interaction zone 2002, (c) computer senses user non touch input device used by user 2004, (d) computer displays user input, interaction on display screen 2006, (e) computer senses user has chosen one toilet device function for activation, from the displayed toilet device function icons, the chosen icon illuminates 2008, (f) computer senses the activation request of the chosen device function icon 2010, (g) computer associates chosen device function displayed icon, with instructions for the activation of the chosen device function 2012, (h) computer checks toilet seat user occupied sensor, to discern if seat is occupied 2014, (i) seat occupied, no 2016, (j) before activating the bidet, the computer checks to see if toilet seat is occupied, if unoccupied the bidet won't be activated 2018, (k) computer sends message to display that seat must be occupied to operate bidet 2020.

The unoccupied computer will activate seat or lid up and down movements (l) 2022, (m) seat occupied yes 2024, (n) if occupied bidet will activate 2026, (o) computer senses user sitting on seat, won't activate seat or lid up or down movement, unoccupied will activate seat or lid up and down movement 2028, (p) computer sends message to display that seat must be unoccupied to operate seat or lid 2030, (q) the computer sends instructions to the toilet motor controller to supply a voltage to the device 2032, (r) the motor controller receives the computer instructions to supply a voltage to the chosen toilet device 2034, (s) the motor controller sends a voltage to the device, the device activates 2036, (t) stop button icon activated by user, device deactivates 2038, (u) computer senses voltage overload caused by lid or seat making contact with user while moving up or down, turns off power to seat or lid 2040, (v) computer doesn't allow seat or lid to move in a direction against each other for example the lid moving down while the seat is moving up 2042, (w) the device deactivates following a predetermined cycle, deactivating at the end of the cycle, 2044, (x) the computer instructs the motor controller to discontinue the voltage supply to the device 2046, (y) the motor controller discontinues supplying the voltage to the device, the device deactivates 2048.

A flowchart of the toilet display control panel component connects, may include, some of the following steps, step (a) interactive display 4001, (b) touch free user input device 4002, (c) computer 4004, (d) smart toilet 4006, as shown in FIG. 13.

A flowchart of the toilet display control panel operation, may include some of the following steps shown in FIGS. 15a and 15b, step (a) computer displays toilet function icons on a display screen 3001, (b) computer senses user, in a user non touch device interaction zone 3002, (c) computer senses user non touch input device used by user 3004, (d) computer displays user input, interaction on display screen 3006, (e) computer senses user has chosen a toilet device function for activation, from the displayed toilet device function icons the chosen icon illuminates 3008, (f) computer senses the activation request of the chosen device function icon 3010, (g) computer associates chosen device function displayed icon, with instructions for the activation of the chosen device function 3012, (h) computer sends device activation instructions to Satis smart toilet 3014, (i) Satis toilet activates requested toilet device function 3016, (j) the device deactivates following a predetermined cycle, deactivating at the end of the cycle 3018, (k) stop button icon activated by user, deactivates device 3020, (l) Satis sends message to computer that device has deactivated 3022, (m) illuminated icon of the chosen device stops illuminating 3024.

The computer 106 can signal the motor controller to activate the bidet 138, heated seat, seat and lid motors, bottom air dryer, and the bidet water temperature heater, etc. The Kinect sensor 102 is connected to the computer. The computer 106 is connected to the, motor controller. The motor controller is connected to the motors 136, 156. The bidet 138 connects to a common, standard pressurized water supply, (not shown).

A Phigets motor controller (not shown) is programmed with Phigets software, made by the Phigets Company, 106. Phigets motor controller software 106 is programmed into the computer 106. The motor controller is connected to either an alternating electrical power supply or to a direct current power source, and directs power to the other electrical components.

The Sony 106 all in one computer includes components, such as, a 61 centimeter touch screen, a 8 GB Memory, a 2 TB Hard Drive, a Windows 8 64 bit Technical details, a 3rd Gen Intel Core i7 processor; a 61 centimeter display; a 2 TB hard drive, a touch screen; a Blu ray playback; a TV tuner; built in wireless networking; Bluetooth; wireless keyboard and mouse; and HDMI output;

The computer 106 could also be chosen from a variety of other comparable computers, such as a Dell computer. The computer 106 could also be a laptop computer, a desktop computer, a portable computer, and a tablet computer, and a computer processor connected to other computer components, etc.

Wall Display Evoluce Operation

The Kinect sensor 102 senses a user, in FIGS. 1 and 2, and turns the display 104 and toilet 108 on. The system comes out of low power mode. The Evoluce and Kinect software 106 recognize that the user is available for interaction, when the user waves one hand, by moving their forearm left and right, facing the Kinect sensor. The Kinect's 102 user skeletal tracking is used to track the user's movements.

The user moves their hand in front on of the screen 104 and Kinect sensor 102, the hand controls a displayed avatar, a displayed pointer or cursor in the shape of a hand, viewed in the display. Either hand can be used to control the avatar. The computer programmed with the Evoluce software 106, understand the user's touch free body movement input, the body movement moves and controls the displayed avatar cursor. The computer 106 moves the cursor, following the hand movements and body movements of the user. The user points the palm of their hand toward the screen, and moves the cursor on the screen. The user moves the cursor until; the cursor is touching the toilet function icon they want to select. The user moves the cursor to the desired menu toilet option. When the cursor to touches the icon function, the icon is highlighted, illuminated, brightened or changes color.

The user activates the chosen toilet devices functions by holding the cursor 146 on the icon which starts a visual timer 146, after about 1 second's time the icon function activates. The visual timer 146 is a encircling of the cursor 144 by a circular line 146.

The user's touch free device activation request input, is received by the computer 106. The user's input request for device activation is identified by the computer 106. The activated function request is processed by the computer 106. The computer identifies the device to be activated, the instructions of the operation of the device, and the sequence of the operation of multiple devices. The computer 106 requests the motor controller to send a voltage to the toilet component. The component receives the voltage and actives. The computer 106 sends the motor controller instructions to stop the voltage to the component. The motor controller stops the voltage to the component. The component stops receiving a voltage and stops functioning.

For example activating the bidet 138, and instructing the bidet cleaning wand 138 to release water. The user moves their hand in front on of the screen 104, moving the cursor 144 to the bidet icon 126. The user activates the bidet function 126 by holding the cursor 144 on the bidet icon 126, which starts the visual timer 146, after about 1 second's time the bidet icon 126 function activates. The bidet's 126 activated function request is processed by the computer 106. The computer 106 associates the activated function with instructions 106, to supply power to the bidet 138. The Sony 106 requests the motor controller to send a voltage to the bidet 138. The computer 106 instructs the motor controller to supply power to the bidet 138. The motor controller supplies a voltage to the bidet 138. The bidet 138 activates and the bidet 138 sprays water out of the bidet's cleaning wand 112. The bidet 138 could also have more than one cleaning wand 112, etc. The bidet cleaning wand 138 can complete a computer 106 controlled, 35 second time period cycle, and stop at the end of the cycle. The user can also stop the bidet wand 112 by activating the stop button icon 114. When the cleaning cycle is completed, the computer 106 instructs the motor controller to discontinue power to the bidet 138, the water stops spraying out of the wand 112. The Kinect sensor 102 detects when the user has vacated the toilet 108, the system is put in low power mode. The user can stop the devices by activating the stop button 114.

The user can activate profiles of preselected toilet device settings and the sequence of the toilet device operations, by activating the profile activation button. The user can create a user profile by accessing a menu of toilet device settings and the sequence of the toilet device operations.

The toilet device's sequence of operation, can follow the stored profile, the sequence of the devices operation and settings. The profile may contain device operations such as, having the seat move 110 to the down position and the lid 150 moving to the up position. When the computer 304 senses the user has occupied the seat 312, the sequence can continue, with the activation of the bidet 138 front wash, the front wash can activate and cycle through a wash cycle, with the water temperature set to mild, the water pressure spray set to mild, the water aerated, when the bidet 138 wash has completed its cycle, the bottom air dryer 124 activates, directing drying air at the bottom. The dryer may have a setting of high air flow and medium air temp, the air blower follows a timed cycle and turns off at the end of the cycle. When the user vacates the toilet seat the lid 110 can be lower, the toilet 108 can automatically flush. The toilet 110 lowers the lid 150 before flushing the toilet 110, this can aid in containing airborne water droplets, caused by the flushing of the toilet 110. The airborne water droplets may also contain bacteria, by minimizing their spread in the air; the bacterial contamination may also be minimized. To avoid spaying water out of the toilet 108, a sensor (not shown) detects when the user is seated on the toilet seat 110, and will only activate the bidet 138 when the seat 110 is occupied.

The touch free user avatar activating toilet control panel system, may use the automatic bidet device 138 to automatically wash a user. The automatic bidet 138 may include the following components. A camera 111 can be an Intel perceptual computing camera sensor 111 or a Microsoft Kinect for windows camera sensor. With the Intel camera 111, the user interaction zone extends from around 20 centimeters to about 1 meter from the front of the Intel camera 111. The computer 106 is connected to the camera 111 by wire. The computer 106 can be programmed with Intel perceptual computing gesture recognition software 106 made by the Intel company, The Intel perceptual computing gesture recognition software 106 made by the Intel company, of Santa Clara, Calif., A Intel Perpetual computing software developer's kit SDK, or Microsoft Kinect for windows software, can be used to create the software for user genital recognition, genital position detecting, and genital evacuation monitoring. The camera 111 is water proofed. The camera 111 connects to the computer 106, and is powered by an alternating current. The camera 111 is cleaned after each use by, a camera water cleaner (not shown), using pressurized water flowing over the camera. A light (not shown) illuminates the inside of the toilet bowel, to aid the camera, in viewing the user's bottom.

The user profile toilet device activation sequence and device settings, may use the automatic bidet device 138 to automatically wash a user. The automatic bidet 138 allows the user to complete toilet activation sequence, without having to add further input, once the user profile has been activated. The Intel perceptual computing camera sensor 111 inside the toilet bowl 108.

The camera 111 detects when the user emits fluids from their bladder or solid material from their bowel. The camera 111 detect the male or female gender of the user, by viewing the user's genital area, and associating the users genital area with pre stored male an female genital information. When a genital association is made the computer 106 identifies the gender of the user. The camera 111 is used to detect the user's front or back position of evacuation. A toilet sensor (not shown) connected to the computer 106, which can detect when the user is seated, allowing for the activation of the user's profile. The camera 111, detect when liquid is emitted from the bladder, front of the user, or when material is emitted from the bowel, the back of the user, or emitted from both front and back. The computer 106 may follow three possible user preprogrammed device operation profiles. The computer 106 can run the users front wash and dry front profile, the users back wash and dry profile, or the users front and back wash and dry profile. The user can stop the automatic cleaning cycle by activating the stop button 114. The user can create and input, their own automatic bidet profiles.

The Intel camera 111 detects when the user has stop emitting fluids or material, the computer 106 can start a user pre-set clock waiting cycle of 60 seconds for back evacuation, and 25 seconds for front evacuation. If the camera 111 doesn't detect fluid material emitted from the user in that time period, the computer 106 assumes the user has finished the evacuation process. The camera 111 can identify, whether the user is male or female. The camera 111 identifies that the user is of the female gender, this activates the possibility of using of the front wash and back wash. If the user is of the male gender this activates the possibility using of the back wash.

As an example, when the female bowel evacuation process is complete, the computer 106 activates the bidet 138 back wash, the back wash can activate and cycle through a 45 second wash cycle, with the water temperature set to warm, the water pressure spray set to medium, the water aerated. When the bidet 138 wash has completed its wash cycle, the bottom air dryer (not shown) activates, directing drying air at the user's bottom. The dryer having a setting of medium air flow and medium air temp, the air blower follows a timed 30 second cycle and turns off at the end of the cycle, when the user vacates the toilet seat 110, the lid 150 can be lower, and the toilet 108 can automatically flush.

Additional Alternate Embodiments Are Shown In FIGS. 1, 2, 3, 4, 5, 6, 7, 8, 9, 10, 11, 12, 16. 17, 18

Leap Motion Controller All In One Computer Display Description

Figure 5:
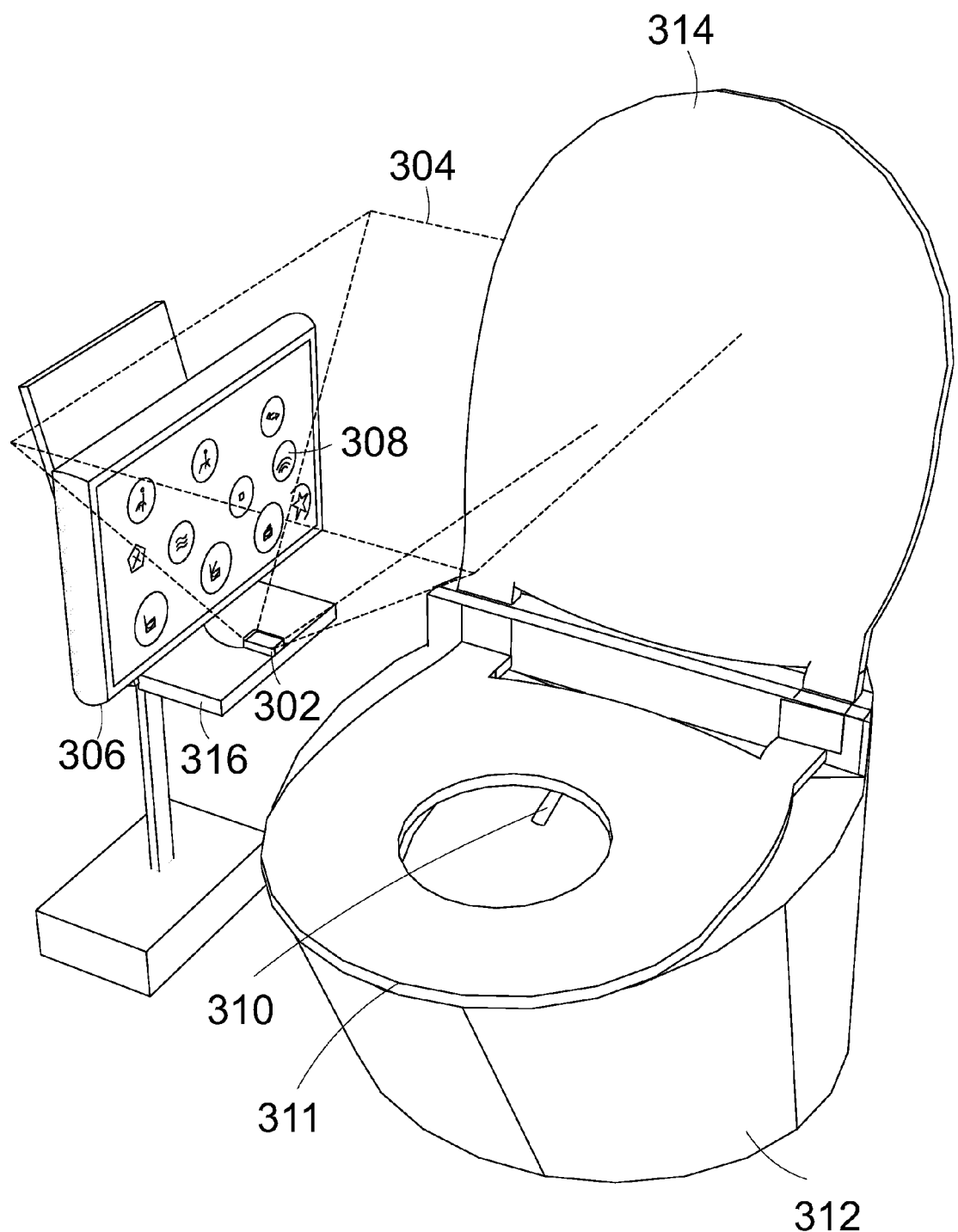
FIG. 5 is a front top right side perspective view of a Leap touch free interactive three dimensional controller connected to the display, and to the smart toilet.

A Leap Motion controller 302 made by the Leap Motion Company of San Francisco, Calif., or a Cambord Pico (not Shown) made by the Optoma company of Watford, United Kingdom, or a XTR3D (not shown) made by Creative Reality, of Herzelia, Israel, can be used for touch free three dimensional (3D) screen 306 interaction, as illustrated in FIG. 5. The Leap Motion controller 302 is a small universal serial bus peripheral USB, three dimensional hand recognition device which is designed to be placed on a rest attached to the toilet, or stand 316 next to the toilet 312 with in hand reach of a sitting operator, user. The leap sensor 302 faces upward toward the user. The Leap controller three dimensional hand recognition hardware 302 contains two cameras and three infrared Light Emitting Diodes (LEDs); the device observes a roughly hemispherical area 304, to a distance of about 1 meter (3 feet) 304. The Leap 302 is designed to track input devices, such as, fingers or similar items such as a pen, which cross into the observed area, to a spatial precision of about 0.01 mm. It has a 150 degree field of view and a Z-axis for depth 304. The user can move their hands in 3D, just like they would in the real world. With Leap Motion software applications, using three dimensional hand recognition software 306, the user can reach out and grab objects, move them around, and even change their perspective. The interaction zone is 7 to 8 cubic meters of interactive three dimensional space. The Leap controller 302 discerns the position of the user's fingers. The finger and hand movements can be displayed on the screen 308. The users hand movements can interactive with virtual visual depictions on the screen 308. The leap motion pad connects to a computer 306 by a wire with a USB plug (not shown). The display screen system displays menu icons of the various toilet's' devices functions. Devices may include a bidet, bidet water heater, bidet water temperature control, heated toilet seat, toilet seat and lid up and down positioning, bottom air dryer, internet connection, internet connection for accessing the internet, etc.

The computer may be a Hewlet Packard, Dell, Samsung, Apple, or Sony all in one computer. The display could also be a portable computer display, desktop computer display, a tablet computer display, or a laptop computer display. The leap motion software 306 is programmed into the computer 306. The computer processors may use Intel processors 306 or Advanced Micro device processors. The Dell all in one computer 306 can be programmed with an Apple, Linux or Microsoft's operating system software. The computer 306 can be programmed with Satis Toilet control software application 306, and used with an android 2.3 operating platform 306, or with Kohler Numi toilet software made by the Kohler Company of Kohler, Wis., or with Toto smart toilet software made by Toto Company of Tokyo, Japan. The Satis toilet computer software application 306 can be downloaded, from Google Play of the Google Company.

The Satis toilet 212 is made by the Lixil the toilet company of Tokyo, Japan, The toilet could also be a Toto toilet, made by the Toto Company of Tokyo, Japan. The toilet could also be a Wash toilet, made by the Brondell Company of San Francisco, Calif.

The Leap software 306, a Satis toilet software 306, and Microsoft windows 8 operating software 306, are programmed into the computer 306 and work on the computer 306. The computer 306 has a data storage 306. The computer has a memory for the storage of toilet device operating functions and software. The Dell all in one computer 306 incorporates a display screen 308. The computer 306 can connect to Satis Smart Toilet 312, by a Bluetooth 4.0 wireless connection, a WIFI network connection or a wired connection (not show). The Satis toilet has a Bluetooth transmitter and receiver. The all in one computer 306 is power by a connection to an alternating current; the toilet 312 is powered by a connection to the alternating current. The toilet 312 connects to a standard water supply (not shown). The toilet bidet 310 connects to the water supply.

The user can connect to the internet by choosing, and highlighting the toilet function icon, and activating, double clicking, the displayed internet icon button. The computer 306 connects to the internet (not shown) using a WIFI connection. The WIFI receiver and transmitter 306 are incorporated within the computer 306. The liquid crystal display 308 can show internet content such as internet videos. With a speaker 306 and microphone 306 incorporated within the display 306 the user can make internet video calls. The user can search the internet by interacting with the Leap 302 and viewing the interaction on the display. The user can surf the internet, view internet web pages, view internet content, view and listen to internet TV and view and listen to internet videos. The user can search the internet with the results displayed on the display 308. Internet search engine results can be displayed. Search engines such as Google, yahoo, or Safari, etc., can be used. Using the internet connection 306, the user may verbally chat with people. The user may leave video messages 306 on the display, for other users to activate and view.

The Satis toilet 312 can play music that is included with the toilet 312 or the user can input and play their own music. A user can choose different bidet spray washing water temperatures. The toilet maybe connected to a battery, direct current, backup that operates the toilet if there is a power failure.

The touch free user input device means, is he Leap Motion controller device, Leap Motion software, Microsoft operating system software, and the Satis toilet application software, Android operating system software.

Leap Motion Controller All In One Computer Display Operation

Leap 302 was shown to perform tasks such as navigating a website illustrated in FIG. 5, using pinch to zoom gestures on maps, high precision drawing, and manipulating complex three dimensional 3D data visualizations. The system is activated by a user moving within ranger of the Leap Motion Sensor pad 304.

The Leap pad 304 user interaction zone distance of is touch to about 1 meter. When the system is activated it comes out of low power sleep mode, the display 308 illuminates and display's the interaction between the user and the system Leap sensor pad 302.

The displayed avatar, representation of the hand, touches the icon button on the screen, the button is highlighted. The user double clicks the highlighted icon button that represents the desired user's chosen toilet functions toilet function. The button is activated by being double clicked; the computer 306 identifies the input, and interprets the activated button, and understands the user's touch free input. The computer 306 associates the chosen toilet devices functions, with instructions for the toilet devices operation.

To move a representation of their hands and finger on the screen. The user moves their hand or hands and fingers in the air with in the interaction zone 304 of the Leap sensor 302. The hands moves and controls a three dimensional avatar on the display 308. There are many possible avatars that can be created to interact with the displayed toilet function icon buttons.

The computer sends instructions to the Satis toilet 312 to activate the chosen function. The computer 306 and the toilet 312 communicate using a wireless Bluetooth connection. The toilet 312 receives the computer instructions 306. The toilet 312 follows the instructions, and activates the users chosen toilet device. The device cycles through its cycle and stops at the end of its cycle, or may be stopped by the user activating the stop button. The toilet sends the computer information that the device cycle is complete. The computer 306 sends the cycle complete information, which it received from the toilet 312, to the display 308.

One possible user interaction example may be, the user virtually touches the seat up displayed toilet function icon, the touched icon activates; the computer 306 senses the icon activation. The computer's 306 associates the activated menu function with a toilet function. The computer 306 processes the desired seat up request, and associates the seat up request with seat up instructions for the smart toilet. The computer 306 sends the seat up instructions to the smart toilet 312, The Satis Bluetooth receiver and transmitter incorporated in the toilet 312 receives the seat up instructions sent by the computer 306. The Satis raises and seat 314. The Satis 312 senses when a user is on the toilet seat 314, and only operates the bidet 310 while the user is seated. To avoid the bidet spaying water out of the toilet 312, a sensor (not shown) senses when the user is seated on the toilet seat 314, will only activate the bidet 310 when the user is seated.

Figure 3:
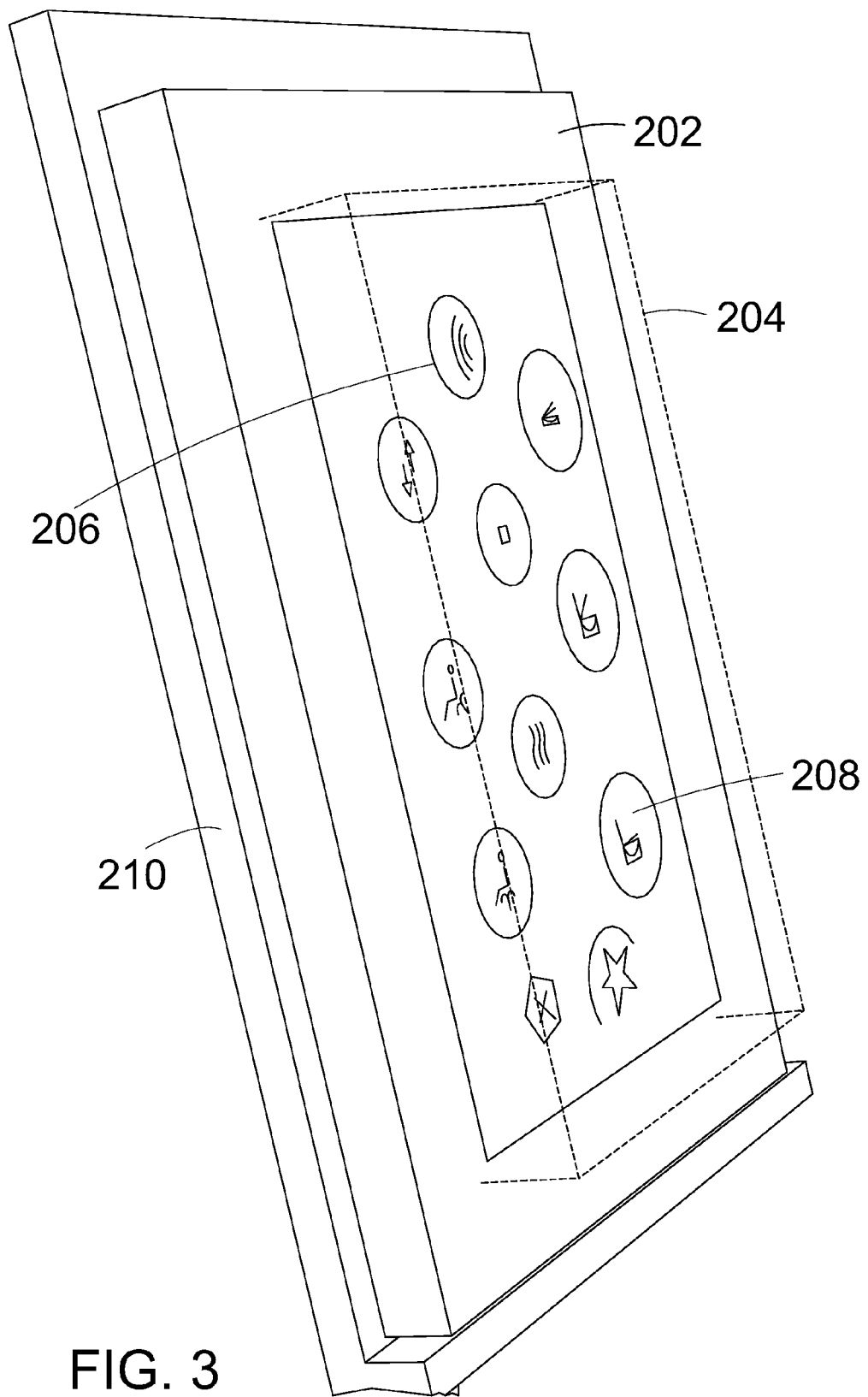
FIG. 3 is a front left side perspective view of a Fogale capacitive field touch free interactive display.
Figure 4:
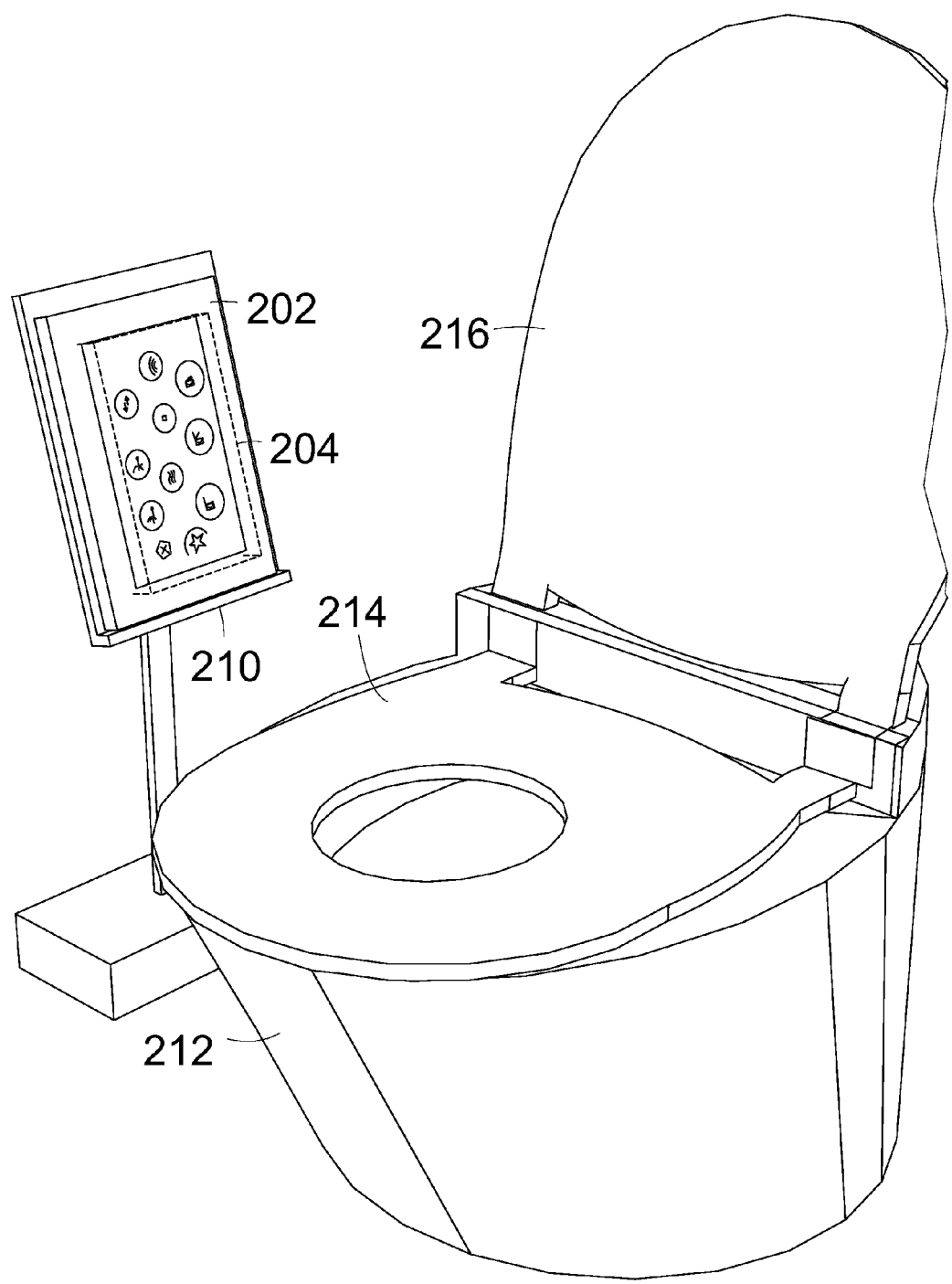
FIG. 4 is a front top right side perspective view of the Fogale capacitive field touch free interactive display and the smart toilet.

Fogale Hygienic Floating Capacitive Touch Free Tablet Display Screen Description A Fogale touch free, floating touch, hover screen display 202, made by the Fogale Nanotech company, of Nimes, France, is removablely docked into a dock, attached to a stand 210 beside a Satis toilet 212, with the display face 206 facing a sitting user in FIGS. 3 and 4. The Fogale can act as a portable toilet remote control. The display screen displays menu icons of toilet functions, of various toilets devices. Devices maybe, a bidet, bidet water heater, water temperature control, heated toilet seat, toilet seat and lid up and down positioning, bottom air dryer, internet connection, internet connection for surfing the internet, etc.

The toilet is a Satis toilet 212. The display 206, screen 206, monitor 206, is incorporated into a Panasonic tablet computer 202. The Panasonic tablet computer 202 is connected by a Bluetooth wireless connection to the Satis smart toilet 212. The Panasonic tablet 202 has a Bluetooth transmitter receiver (not shown) and the toilet 212 has a Bluetooth transmitter receiver (not shown). The tablet computer 202 is programmed with Fogale floating capacitive touch sensing software 202 and Microsoft operating system software 202. The distance which a user can interact with the display face is 206 from touching to around 5 centimeters above the face of the display 204.

The tablet 202 maybe a Hewlet Packard, Dell, Samsung, Apple or a Sony tablet 202. The computer could also be a portable computer 202. The Fogale floating capacitive software 202 is programmed into the tablet 202. The tablet processors 202 may use Intel processors 202 or Advanced Micro device processors 202. The tablet 202 can be programmed with an Apple, Linux or Microsoft's operating system software 202. The Panasonic tablet 202 is programmed with Satis Toilet control software application 202, and used with an android 2.3 platform 202. The Satis toilet tablet software application 202 can be downloaded, from Google Play of the Google Company. The Fogale software, which a is user interactive capacitive field software 202, a Satis toilet software 202, and Microsoft software 202, are programmed into the tablet 202 and work on the tablet 202. The Samsung all in one tablet 202 incorporates the display screen 308. The tablet 202 can connect to the Satis Smart Toilet 212, by a Bluetooth 4.0 wireless operable connection, a WIFI network connection or a wired connection (not show) 202. The tablet 202 is power by a connection to an alternating current; the toilet 212 is powered by a connection to the alternating current. The toilet 212 connects to a standard water supply (not shown). A toilet bidet (not shown) connects to the water supply.

The user can connect to the internet by choosing and activating the displayed internet icon button (not shown). The Panasonic tablet 202 connects to the internet (not shown) using a WIFI operable connection. The WIFI receiver and transmitter 202 are incorporated within the tablet 202. The display 206 can show internet content such as internet videos. With a speaker 202 and microphone 202 incorporated within the tablet 202 the user can make internet video calls. The user can search the internet by interacting with the Fogale display 302. The user can surf the internet, view internet web pages, view internet content and view and listen to internet videos, using the tablet 202.

The user can search the internet with the search results displayed on the display 206. Internet search engine results can be displayed 206. Search engines such as Google, yahoo, or Safari 202, etc., can be used. The user may verbally chat with people, using the internet connection 202. The user may leave video messages 202 on the display 206 for other users to activate and view.

The toilet 212 plays music that is included with the toilet 212, or the user can input and play their own music. A user can choose different bidet (not shown) water temperatures for washing. The Satis toilet maybe connected to a battery (not shown), direct current back up that operates the toilet, if there is a power failure. The toilet 212 has a Bluetooth transmitter and receiver 212.

The touch free user input device and touch free user input device software means, is the Fogale touch free, floating touch, hover screen display 202, Fogale software 202 and Microsoft operating system software, and the Satis toilet Application software, Android operating system software.

Fogale Touch Free Tablet Display Operation

The display 206 is turned off in low power sleep mode a sensor connected to the tablet senses when a user is near the display 206, and turns on the tablet 202 in FIGS. 3 and 4. The Fogale's electric field is disrupted by an object entering the field like a finger, or other body parts, the field measures the disruption. By measuring the disruption the system can discern the position of a finger. The electric field is disrupted by an object entering the field like a finger, and the computer measures the disruption in the field, and senses the opening and closing off the field. By sensing the field disruption, the Fogale can discern the position of a finger, or fingers, a stylus, a pencil, etc.

A user places their fingers hovering in the air, above the display 206. The display 206 senses when the user is in the interaction floating touch range 204 of the display. The user interaction zone 204 is the surface 206 to around 3 centimeters above the display face 206. The icon 208 that the finger is positioned over enlarges, changes color or highlights, showing the finger is positioned to choose the icons 208 functions, and is available to be activated. The user activates the icon 208 function by moving their finger downward in the air then upward in the air, in a finger tapping motion, without touching the display surface 206. The tapping of the finger over the icon 208 activates, double clicks the menu function. Sensors measures the capacitive field above the display 206, by a finger entering the field, the field closes and the sensors sense the closing of the fields, thus sensing the position of the fingers. The user double clicks the icon button that represents the desired toilet function. The tablet computer 202 associates the touch free activation input menu function 208 with a toilet component function.

The tablet 202 instructs the smart toilet 212 to supply power to the component that's being activated. The component activates. For example there is a request to heat the water emanating from the bidet cleaning wand (not shown). The tablet 202 senses the requested function when the function icon 208 is activated, by the user touching in the field 204, in the air, above the displayed icon 208 on the screen 206. The tablet 202 associates the activated function, with instruction to supply power to the bidet. The tablet 202 instructs the toilet 212 to supply power to the bidet water heater (not shown); the water being sprayed out of the cleaning wand's temperature is increased.

The bidet cleaning wand (not shown) can complete a wash cycle and stop at the end of the cycle. The user can also stop the wand by activating the stop button icon (not shown). When the cleaning cycle is completed, the computer 202 instructs the Satis toilet 212 to discontinue the water stops spraying out of the wand, and powering the heater. Using hovering touch 204 to activate the lid up button 208, will activate the lid up motor (not shown), thus moving the lid from resting on the seat 214 to the lid 216 up position.

The smart toilet 212 receives the tablet 202 instructions. The toilet, 212 follows the instructions, and activates the chosen toilet device. The device cycles trough it cycle, and stops at the end of its cycle, or may be stopped by the user activating the stop button (not shown). The toilet 212 sends information to the tablet 202 that the device cycle is complete. The tablet 202 displays 206 the information, that the device cycle has been completed.

Tobii Eye Tracking Touch free toilet Panel display Description

Figure 8:
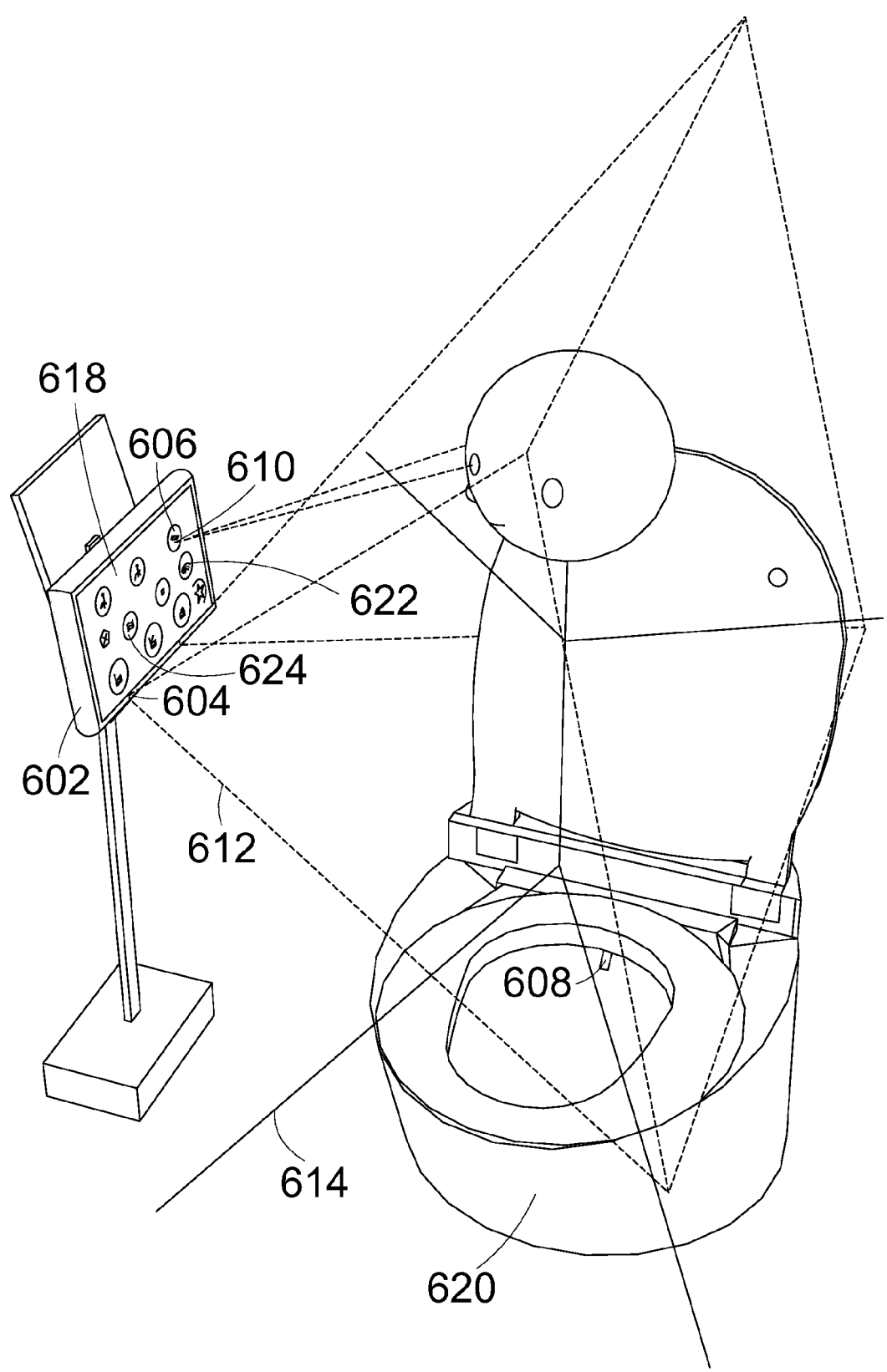
FIG. 8 is a front top right side front perspective view of a Tobii eye tracking touch free interactive display, and the smart toilet.

The Tobii, eye tracker 604 and eye tracking sensors 604 are made by the Tobii Technology Company of Danderyd, Sweden. The Tobii eye tracker 604 is a touch free user input hardware 604 and touch free user input software 602. The Tobii 604 is connected to an Acer all in one computer 602. The eye tracker 604 is a device 604 that uses projection patterns and optical sensors 604 to gather data about gaze direction or eye movements with very high accuracy, as illustrated in FIG. 8. The eye tracker 604 is based on the fundamental principle of corneal reflection tracking. The display screen 618 displays menu icons 606 of toilet functions of the various toilets' devices, such as, the bidet wand mover icon 606. Devices may be, a bidet, bidet water heater, bidet wand 608, water temperature control, heated toilet eat, toilet eat and lid up and down positioning, bottom air dryer, internet connection, internet surfing, etc. The user can activate their stored user toilet device preference settings, by a toilet device function activation request of the computer. By requesting the user's profile, which is stored in the computer. By activating the user profile button (not shown), the user's sequence of device operation, the devices setting, the toilet device settings preferences, are run by the computer. The preferences may be seat and lid positions, toilet seat temperature, bidet water temperature, bidet water spray pressure, internet TV, etc.

The computer is programmed with Tobii eye tracking software 602, Satis toilet software 602 and Microsoft operating system software 602. The Acer all in one computer 602 is power by a connection to an alternating current. The toilet is a Satis smart toilet. The toilet is connected by wire to the computer. The distance which a user can interact 612, the user interaction zone 612, with the Tobii cameras 604 installed in the display 602, is from 20 centimeters to 2 meters. The Acer computer 602 connects to the internet using a WIFI 602 connection.

The computer 602 could also be a portable computer 602. The Tobii software 602 is programmed into the Acer 602. The Acer all in one computer processors 602 may use Intel processors 602 or Advanced Micro device processor 602. The computer 602 has a memory for storing toilet device functions, the stored toilet device functions can be accessed by accessing the computer's memory 602. The Acer 602 is programmed with Satis Toilet control software application 602, and used with an android 2.3 platform 602. The Satis toilet software application 602 can be downloaded, from Google Play of the Google Company. The Tobii software 602, the Satis toilet software 602, and the Microsoft software 602, are programmed into the Acer 602, and work, run on the Acer 602. The Acer 602 incorporates the display screen 618. The Acer 602 can connect to the Satis Smart Toilet 620, by a Bluetooth 4.0 wireless connection, a WIFI network connection or a wired connection (not show) 602. A toilet bidet 608 connects to the water supply.

The user 614 can connect to the internet by choosing and activating the displayed internet icon button 622. The Acer 602 connects to the internet using a WIFI connection 602. The WIFI receiver and transmitter are incorporated within the Acer 602. The liquid crystal display 618 can show internet content such as internet videos, with a speaker 602 and microphone 602 incorporated within the Acer 602 the user can make internet video calls. The user 614 can search the internet by interacting with the Acer display 602. The user 614 can surf the internet, view internet web pages, view internet content and view and listen to internet videos, using the Acer 602. The user can search the internet with the search results displayed on the display 618. Internet search engine results can be displayed 618. Search engines such as Google, yahoo, or Safari, etc., can be used. The user 614 may verbally chat with people, using the internet connection 602. The user may leave video messages 602 on the display 618 for other users to activate and view. The toilet 620 plays music that is included with the toilet 620 or the user can input and play their own music. A user can choose different bidet 608 water temperatures for washing, The touch free user input device means, is the Tobii, eye tracker 604 and eye tracking sensors, Tobii eye 602 software, Android software Microsoft operating system software, and Satis toilet application software Tobii Eye Tracking Touch Free Toilet Panel Display Operation FIG. 8 shows the display 618 is turned off, and is in low power sleep mode. A sensor (not shown) senses and signals the computer 602 when the user is in the eye interaction range 612 of 20 centimeters to 2 meters from 612 the display face 618, the computer activates the system. Finding the user's eyes is the first thing the eye tracking system does. It is also used in specific features, such as power saving by dimming the screen when eyes are not present etc. Calculating the position of the eyes in real time makes the eye tracking system accurate and precise, while allowing the user to move freely.

Before eye tracking starts, the system calibrates to the user's eyes. The eye tracker 604 calibrates to a uses eyes after about 3 seconds. By identifying individual eye characteristics, the eye tracker can estimate the gaze point with very high accuracy. Tobii eye trackers can even use a calibration free setup, where calibration is carried out undetected by the user. The Tobii eye tracker 604 incorporates near infrared micro projectors 604, optical sensors 604 and image processing 604. Micro projectors 604 create reflection patterns on the eyes 614.

Image sensors 604 register the image of the user 614, the eyes and the projection patterns 614, in real time. Image processing 604 is used to find features of the user eyes 614, the eyes 614 and projection patterns 614. Mathematical models are used to exactly calculate the eyes position and gaze point.

Eye tracking is fast, intuitive and natural. The gaze point 610 or dwell point can be focused on the chosen toilet function icon, such as the bidet wand mover 606. The wand icon 606 is highlighted when gazed 610 at for a time period of 500 microsecond or 0.5 seconds, to 900 microseconds; or 0.9 seconds. The wand icon 606 is activated by continued gazing at the icon for a specified amount of time of 500 micro seconds to 900 microseconds.

The computer 602 associates the activated icon menu function, such us the bidet wand forward and back wand mover 606 with a toilet device. The computer 602 instructs the toilet 620 to supply power to the component that's being activated, such as the bidet wand 608. The component activates. For example there is a request to heat the water emanating from the cleaning wand 608, the computer 602 connected to the Tobii sensors 604 senses that the function 624 is to be activated by the user 614, when the user 614 gazes at the water temperature increase or decrease icon 624. When the Tobii 604 sense the user 614 has gazed at the icon 624 for a certain amount of time, the temperature icon 624 is activated. 608 The computer 602 instructs the toilet 620, to supply power or stop supplying power to the bidet water heater (not shown); the water temperature of the water being sprayed out of the cleaning wand, is increased 608 or decreased. The bidet cleaning wand 608 can complete a cycle, and stop at the end of the cycle. The user can also stop the wand 608, by activating the stop button icon. When the cleaning cycle is completed, the computer 602 instructs the toilet 612 to discontinue the supplying water, the water stops spraying out of the wand 608, and stops powering the water heater.

Using Nuance Voice Recognition to Choose Displayed Menu Options Description

Figure 10:
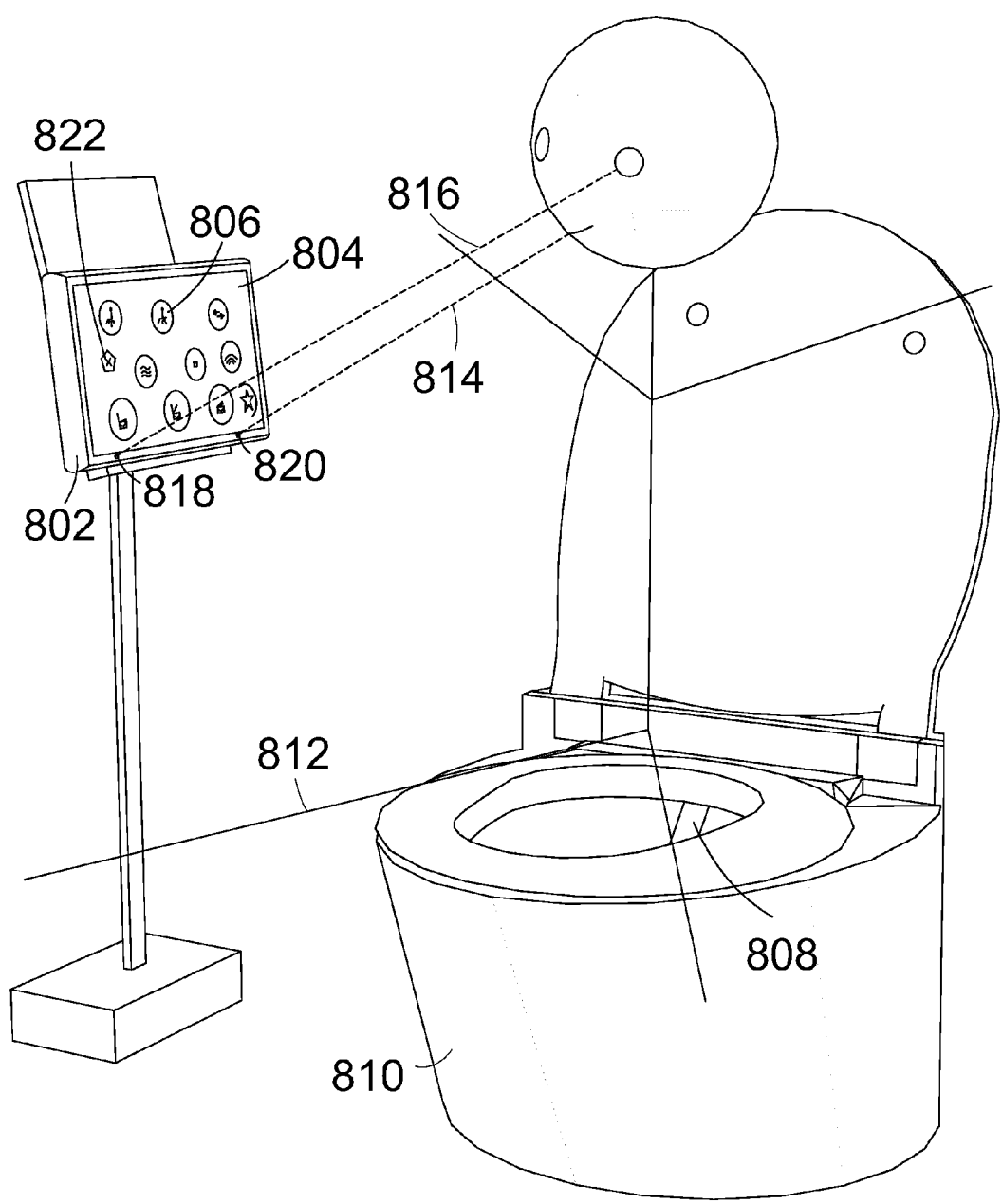
FIG. 10 is a front top right side perspective view of a Nuance voice recognition touch free interactive display, and the smart toilet.

FIG. 10 shows, Nuance voice recognition software 802, made by the Nuance Company of Burlington, Mass., which is programmed into an Apple all-in-one computer, is made by the Apple Company of, Cupertino, Calif. Other speech recognition software such as Apple Siri, Microsoft speech recognition or Google voice interactive glasses can be used. The computer 802 has a microphone 820 and a speaker 818, as shown in FIG. 10. The speaker emits sound, from possible internet TV, internet videos, internet voice chat, recorded sound, etc. Sound is heard within the interactive hearing pathway, hearing zone 816, having a range of surface to 3 meters. The computer 802 connects to a Satis smart toilet 810, by a Bluetooth connection; thought a wired connection could be used. The distance which a user 812 can interact with the microphone 820, the user vocal interactive pathway 814 with the microphone 820, is from touching to around 3 meters. The computer 802 connects to the internet using a WIFI connection. The nuance can converse with the user using many languages, such as French, Japanese, Swedish, Spanish, etc. The voice recognition can converse in a male, female or non gender voice. Using Siri software the toilet can carry on a conversation with the user.

The Apple all in one computer 802 is power by a connection to an alternating current, the Satis toilet 810 is powered by a connection to an alternating current, the toilet supplies power to the toilet's electrical components.

The display screen 804 displays menu icons 806 of toilet functions of the various toilets' devices such as the bidet wand mover icon 808. Devices may be, a bidet 808, bidet water heater, bidet wand mover 808, water temperature control, heated toilet eat, toilet seat and lid up and down positioning, bottom air dryer, internet connection, internet surfing, etc.

The Apple 802 can be programmed with an Apple, Linux or Microsoft' operating system software 802. The Apple 802 is programmed with Satis Toilet control software application 802, and is used with an android 2.3 platform 802. The Nuance voice software 802, the Satis toilet software 802, are programmed into the Apple 802, and work, run on the Apple 802. The Apple 802 incorporates the display screen 804. The Apple 802 can connect to the smart toilet 810, by a Bluetooth 4.0 wireless connection, a WIFI network connection or a wired connection (not show). The Apple 802 is power by a connection to an alternating current; the toilet 820 is powered by a connection to the alternating current. The Satis toilet 810 connects to a standard water supply (not shown). The toilet bidet 808 connects to the water supply.

The touch free user input device means, is the microphone 820, the Apple 802, Nuance voice recognition software 802 software and Microsoft operating system software, and the Satis toilet Application software.

Using Nuance Voice Recognition to Choose Displayed Menu Options Operation

The microphone 820 listens for a speech, vocalization of words, verbal, communication, oral communication, and spoken language, as shown in FIG. 10. A sensor (not shown) senses and signals the computer 802 when the user is in the interaction range 814 of touch to 3 meters 814 from the display face 804, the computer 802 activates the system.

The user gives a vocal 814 command, for the icon 806 to be activated. The user 812 vocally speaks 814 the name of the icon 806 function; the icon 806 is highlighted by the computer 802. The user says 'yes", the icon 806 is activated. The computer 802 senses the chosen function, the user's toilet device activation input. The computer associates the chosen command with instructions for the activation of a toilet device. The computer 802 sends the toilet device function operation instructions to the toilet. For example, the instructions may include the supplying of a power to a toilet component, such as, power to an electronic bidet 808. The user's input request to operate the bidet 808 activates the bidet to release water, through the bidet cleaning wand nozzle 808.

The computer 802 associates the activated icon menu function 806, such us the bidet wand back spray icon 806 with a toilet device 808 function. The computer 802 instructs the smart toilet 810 to supply power to the component that's being activated, such as the bidet 806. The bidet 806 component activates. The component stops when the function cycle ends, or the user activates the off button icon 822. For example there is a verbal request for water to emanate from the cleaning wand 808. The computer 802 connected to the microphone 820 senses the user vocally requesting the bidet wash water, the bidet wash icon is highlighted on the display, and them is activated by saying yes. The computer 802 associates the activated function with instructions 802 to supply power to the bidet. 808 The computer 802 instructs the toilet 810 to supply power to the bidet water pump (not shown); the water is sprayed out of the cleaning wand's 808. The bidet 808 cycles through a 45 second cleaning cycle and stops. The computer 802 instructs the toilet 820 through the bidet's 808 cycle, at the end of the cycle, the computer discontinues water spraying out of the wand 808.

For example there is a request to increase the temperature of the water emanating from the bidet cleaning wand 808, the computer 802 programmed with the Nuance voice software microphone 820 senses that the function 822 is to be activated by the user 812, when the user 812 verbally speaks the icon functions water temperature increase or decrease icon 822 name of, 'heat water', the heat water icon 822 is highlighted. The temperature icon 822 is activated when the Nuance voice software microphone 820 sense the user 812 has, said "yes" 814 when the icon 822 is highlighted. The computer 802 associates the activated function with instructions 802 to supply power to the bidet, 808. The computer 802 instructs the toilet 810 to supply power or stop supplying power to the bidet water heater (not shown); the water temperature of the water being sprayed out of the cleaning wand 808 is increased or decreased. The bidet cleaning wand 808 can complete a cycle and stop at the end of the cycle. The user can also stop the wand 808 by activating the stop button icon (not referenced numbered). When the cleaning cycle is completed, the computer 802 instructs the Satis toilet 810 to discontinue water to the wand, the water stops spraying out of the wand 808, and the toilet stops powering the heater.

STMicroelectronics Floating Capacitive Touch Free Smart Phone Display Description A touch free, floating touch, capacitive screen display 402, made by the STMicroelectronics Company, of Geneva, Switzerland is incorporated into a Nexus smart phone. A Nexus smart phone is removably securable to a side rest attached to a Satis toilet 412 or a wall dock 408 with the phone display face 406, facing a sitting user. The smart phone has a computer, with a memory. The memory can store toilet device and toilet device icon operation information, and software. The stored toilet device operation information can be accessed by the computer.

Figure 6:
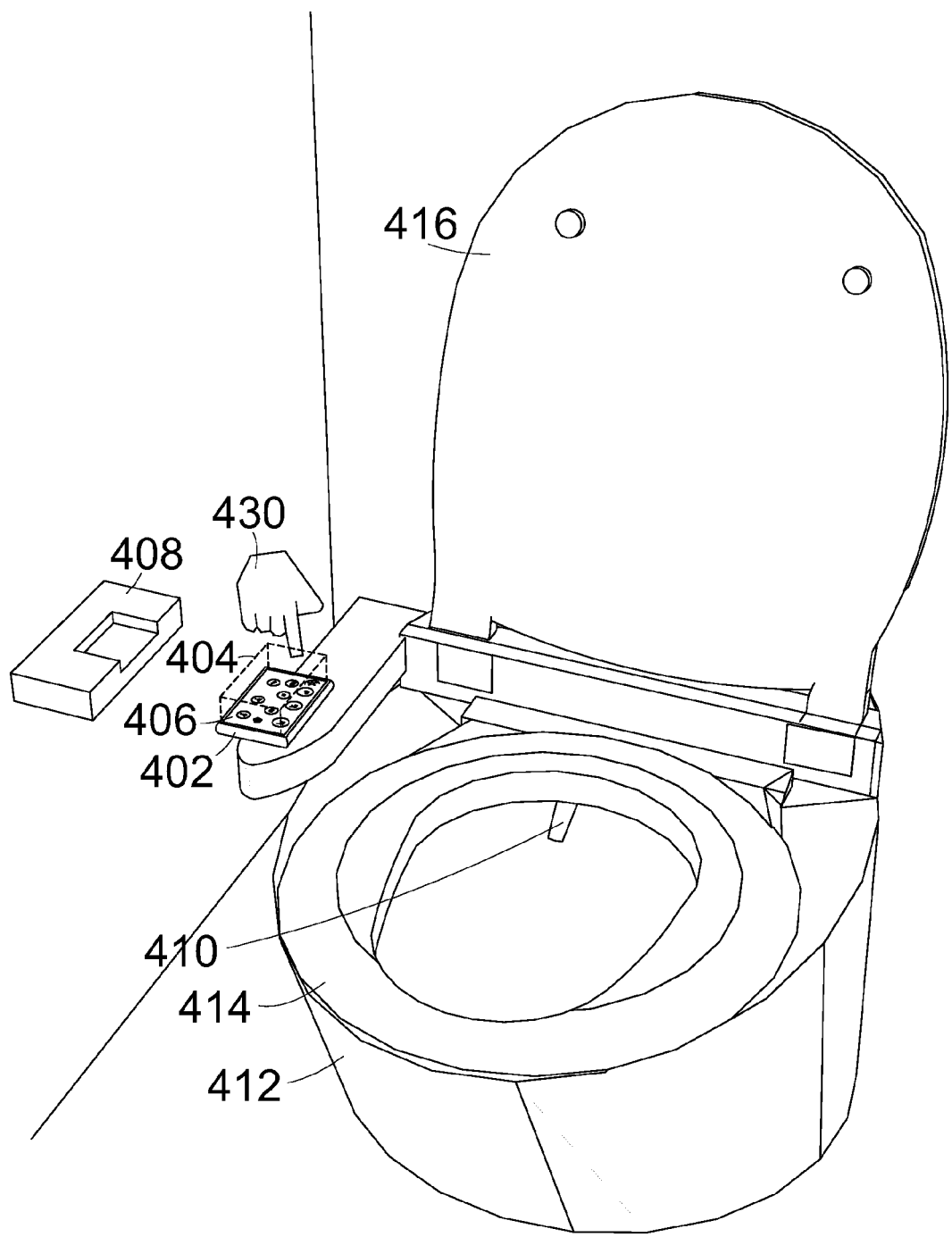
FIG. 6 is a front top left side perspective view of a STMicroelectronics capacitive field touch free interactive phone display, and the smart toilet.
Figure 7:
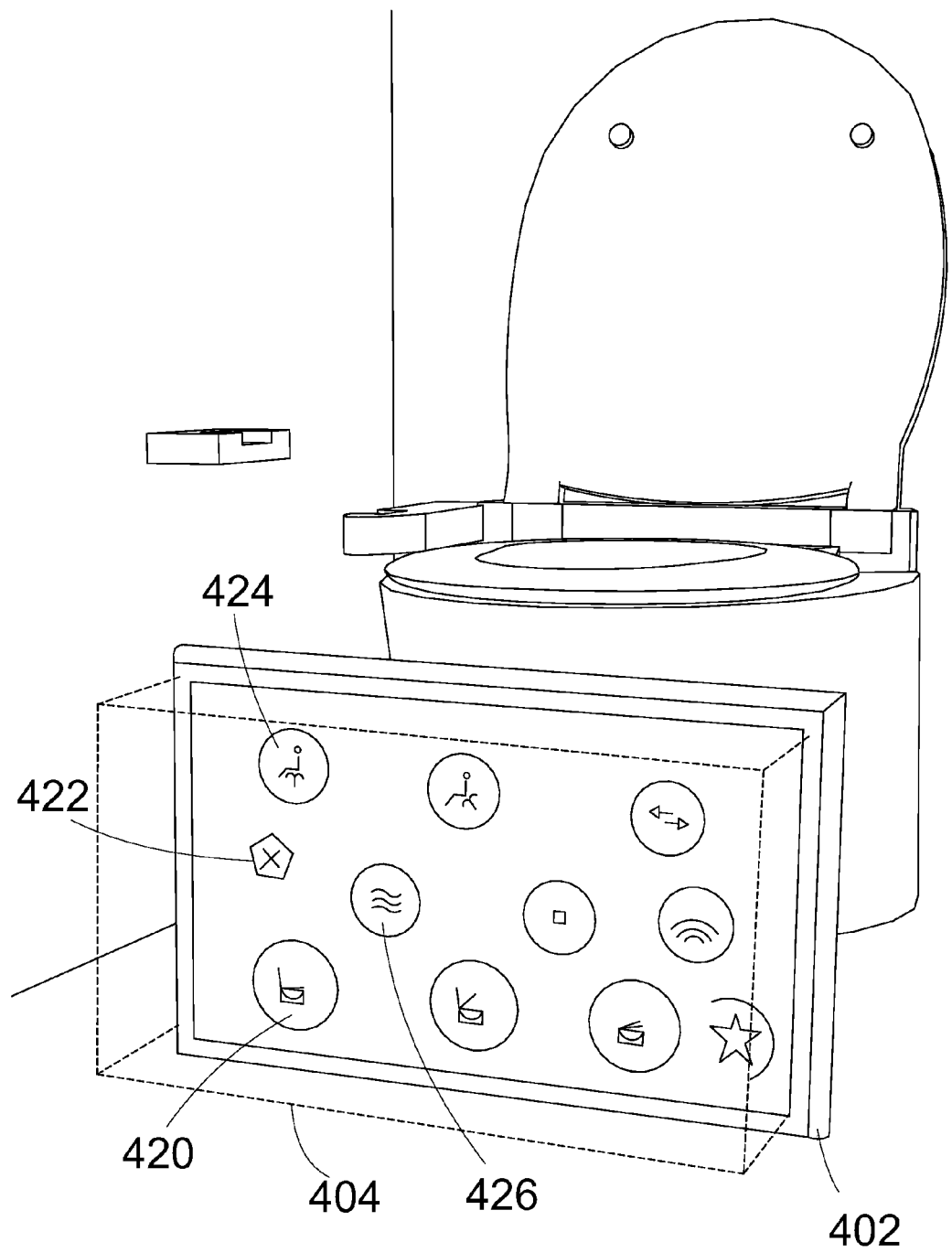
FIG. 7 is a front right side perspective view of the STMicroelectronics capacitive field touch free interactive phone display, and the smart toilet.

The Nexus 402 can act as a portable toilet remote control 402 as illustrated in FIGS. 6 and 7. The display screen 406 displays menu icons 424 of toilet functions of the various toilets' devices 412. Devices may be, a bidet front wash 424, bidet water heater, water temperature control, heated toilet seat, toilet seat 414 up, lid 416 up and down positioning icon 420, bottom air dryer, internet connection icon 426, internet surfing, device off button 422, etc.

The smart toilet is a Satis toilet 412. The display 406, the screen 406, the monitor 406, is incorporated into a Nexus smart phone 402 made by Google company of Los Angeles, Calif. The Nexus smart phone 402 has a computer 402 within the phone 402. A processor chip named Fingertip is 402, which made by STMicroelectronics is the user interactive capacitive field hardware, within the phone 402 and is part of the touch free, floating touch, hovering touch, capacitive screen display 402. The capacitive field above screen 406 is very sensitive it can register a finger 430, or a pencil hovering above the screens icons.

The STMicroelectronics smart phone 402 is connected by a Bluetooth wireless connection to the smart toilet 412. The Nexus 402 has a Bluetooth transmitter receiver 402 and the toilet 412 has a Bluetooth transmitter receiver 412. The Nexus smart phone computer 402 is programmed with STMicroelectronics floating capacitive touch sensing software 402, and android operating system software made by Google company 402. The user interaction zone is from touching to around 4 centimeters above 404 the face of the display 406. The zone is the distance above 404 the display face 406, with which a user 430 can interact with the Nexus 406.

The Nexus smart phone 402 may also be a, Samsung, Apple, and Sony 202. The STMicroelectronics floating capacitive software 402 is programmed into the Nexus 402. The Nexus processors 402 may use Intel processors, Qualcomm processors, or Advanced Micro device Processors 402. The Nexus 402 can be programmed with an Apple, Nokia S40 operating system, Blackberry, Qualcomm, Linux or Microsoft's operating system software 402. The Nexus 402 is programmed with Satis Toilet control software application 402, and used with an android 2.3 platform 402. The Satis toilet tablet software application 402 can be downloaded, from Google Play of the Google Company. The STMicroelectronics software 402, a Satis toilet software 402, and Microsoft software 202, are programmed into the Nexus 402 and work with the Nexus 402. The Nexus 402 can connect to the Smart Toilet 412, by a Bluetooth 4.0 wireless connection, a WIFI network connection or a wired connection (not show). The Nexus 402 is power by a connection to an alternating current, or by the in phone direct current battery, the toilet 412 is powered by a connection to the alternating current. The toilet 412 connects to a standard water supply (not shown). A toilet bidet 410 connects to the water supply.

The user can connect to the internet by choosing and activating the displayed internet icon button (not shown). The Nexus 402 connects to the internet (not shown) using a WIFI connection. The WIFI receiver and transmitter 402 are incorporated within the Nexus 202. The liquid crystal display 406 can show internet content such as internet videos, with a speaker 402 and microphone 402 incorporated within the Nexus 402 the user can make internet video calls. The user can search the internet by interacting with the STMicroelectronics display 402.

Using the Nexus smart phone 402 user can access the internet, view internet web pages, play online computer games, view internet content and view and listen to internet videos. The user can search the internet with the search results displayed on the display 406. Internet search engine results can be displayed 406. Search engines such as Google, yahoo, or Safari 402, etc., can be used. The user may verbally chat with people on the internet, using the internet connection 402. The user may leave video messages 402 on the display 406 for other users to activate and view.

The toilet 412 plays music that is included with the toilet 412 or the user can input and play their own music. A user can choose different bidet (not shown) water temperatures for washing, The toilet 212 maybe connected to a direct current battery (not shown), back up that operates the toilet if there is a power failure. The toilet 412 has a Bluetooth transmitter and receiver 412.

The touch free user input device means, is the STMicroelectronics processor chip Fingertip touch free, floating touch, capacitive screen display 402, Nexus smart phone 402, programmed with STMicroelectronics software 402, android operating system software, and the Satis toilet Application software 402

STMicroelectronics Floating Capacitive Touch Free Smart Phone Display Operation

The electric field 404 is disrupted by an object entering the field like a finger, the field measures the disruption in the field 404, the STMicroelectronics senses the opening and closing off the field 404 as illustrated in FIGS. 6 and 7. By sensing the changes in the field 404 the STMicroelectronics software 402 can discern the position of a finger, or fingers, a stylus or a pencil, etc.

The Nexus senses when the user is in the interaction range 404 of touch to around 4 centimeters above the display face 406 the Nexus computer activate the system. The icon 420 enlarges when a finger is positioned over the icon, the enlargement shows the finger is positioned to choose the icon's 420 functions and is available to be activated. The user activates the icon 208 function by moving their finger downward in the air then upward in the air, in a finger tapping motion, without touching the display 406. The tapping of the finger over the icon 420 activates, clicks the menu function. The sensor measures the capacities' field above the display 406; by a finger entering the field 404, the field 204 closes, and the sensor 402 senses the closing of the field 404, thus sensing the position of the fingers. The activated menu 420 function is associated with an associated toilet device function. The touched device function is associated with activating a toilet device. The computer 402 instructs the Satis toilet 412 to supply power to the component that's being activated. The component activates, the user can press the off button 422, to turn off the device, such as turning off the bidet.

For example there is a request to move the lid 416 to an up position, from in the down position of resting on the seat 414. The Nexus computer 402 senses the requested function, by the user activating the lid up icon, by the user tapping their finger in the capacitive field above the icon, the user uses their body parts, fingers to affect the capacitive field. The computer 402 associates the activated function with instruction to supply power to the lid motor (not shown). The Nexus 402 instructs the toilet 412 to supply power to the lid motor.

The toilet lid motor moves clock wise or counter clockwise, moving the lid 416 to an up or down position. The lid 416 moves to the up position, the computer sense the 416 lid has moved to the up position, the Nexus 402 instructs the motor controller (not shown) to stop supplying power to the lid motor. When power is discontinued to the lid motor the lid's 416 movement stops, and rests in the up position.

Eye Tracking, and Voice Recognition, in a Combination Embodiment Description

The Tobii, eye tracker, eye tracking sensors 1026 made by the Tobii Technology Company, is installed in a Hewlet Packard all in one computer 1002 which is made by the Hewlet Packard Company of Palo Alto, Calif., shown in FIG. 12. A microphone 1008 and speaker 1006 are installed in computer 1002. The display screen 1026, displays menu icons 1022 of toilet 1020 functions of the various toilets devices 1020, such as, a bidet wand mover icon. Displayed devices may be a bidet front wash 1022, bidet back wash 1024, bidet water heater, bidet wand spray, water temperature control, water aeration, heated toilet seat, toilet seat and lid up and down positioning, bottom air dryer, internet connection, internet surfing, etc. The computer 1002 is programmed with Tobii eye tracking software 1002, Nuance voice recognition software 1002 and Kohler Numi smart toilet software 1002, and Microsoft operating system software 1002.

The user eye tracking interaction zone, the distance in which a user 1018 can interact, with the Tobii cameras 1026, which are installed in the display 1026, is from 20 centimeters to 2 meters. The distance which a user 1018 can interact, the user 1018 interaction zone 1028, with the Nuance voice recognition 1002 microphone 1008 is touch to about 3 meters. The computer 1002 connects to the internet using a WIFI 1002 connection. The computer 1002 can connect to the Satis 1020, by a Bluetooth 4.0 wireless connection, a WIFI network connection, or a wired connection (not show). The Satis toilet 1020 has an installed bidet 1020. The user 1018 can listen 1014 to internet content from the computer speaker 1006 and view internet content on the display 1026.

An intelligent toilet control panel display system 1026, with a voice control system comprises a variety of toilet devices (not shown) arranged on the toilet body 1020, which is characterized in that the intelligent toilet with the voice control system is provided with a device voice switching control system, the actuator voice switching control system comprises a master control CPU 1002, a power circuit, a voice collecting circuit, a press key input circuit, a voice recognition and storage circuit and a power amplifying drive circuit, wherein the control panel display, the voice collecting circuit, the press key input circuit and the voice recognition and storage circuit are connected with the master control CPU 1002, the press key input circuit and the voice collecting circuit can store pre-set voice signals into the voice recognition and storage circuit, the vice collecting circuit can transfer the voice signals to digital voice signals which are transmitted to the voice recognition and storage circuit through the master control CPU 1002, the digital voice signals received by the voice recognition and storage circuit are used to compare with the pre-set voice signals to generate a feedback signal which is transmitted to the master control CPU 1002, the master control CPU 1002 is connected control panel display 1004, and the I/O input port of the master control CPU 1002 is electrically connected with the toilet devices through the power amplifying drive circuit.

Eye Tracking, and Voice Recognition, in a Combination Embodiment Operation

The microphone 1008 listens for a user's 1018 speech, vocalization of words, verbal communication, oral communication, spoken language shown in FIG. 12. The user 1018 vocally speaks 1028 the name of the displayed toilet device functions icon 1022 function; the icon 1022 is highlighted by the computer 1002. The user 1018 gives a verbal 1028 command, for the icon 1022 to be activated. The user says 1028 the 'yes" command, the icon 1022 is activated. The computer 1002 associates the chosen function with Numi smart toilet 1020 instructions the computer 1002 sends the instructions to the toilet 1020 to supply a power to the chosen toilet component.

Tobii's eye tracker senses and signals the computer 1002 when the user is in the interaction range, of 20 centimeters 2 meters from the display face 1004, and the computer 1002 activates the system shown in FIG. 12. The eye tracking sensors calibrates to a user's eyes after 3 seconds.

The eye movements control the movement of the pointer, avatar or cursor 1012 on the display 690. The eyes acts as a mouse, controlling in synchronisation with the eyes the movement of the pointer, on the screen 690. The user controls the cursor, and chooses toilet menu options by positioning the pointer over the desired menu option on the display 690, and blinking their eye, the menu option is clicked and picked, as illustrated 442*a* and 442.

The user 610 can also activate the icon 606, by looking at the icon 606 which highlights the icon 606; once the icon 606 is highlighted the user 610 can blink, open and close their eye lids 610 to click the icon 606.

For example the user's cursor 1012 is on the chosen toilet function icon 1024; the cursor 1012 is on the icon 1024, which highlights the back wash icon 1024. The back wash icon 1024 is highlighted, the cursor 1012 touches the icon; the back wash icon 1024 is activated by the user blinking.

The user 1018 may use both, the Tobii Eye tracker 1026 and Nuance Voice Recognition 1008 together, to activate and deactivate the smart toilet devices 1020. A user may say 1028 front wash, the front wash icon 1022 is highlighted, the user 1018 says yes, the fount wash icon 1022 is activated, the user gazes 1012 at the stop button 1010 for a predetermined amount of time, the stop button 1010 is activated and the, bidet 1020 is stopped. The user 1018 gazes at the back wash icon for a predetermined amount of time, the back wash icon 1024 is activated, the user 1018, says stop, the stop button 1010 is highlighted, the user say yes, the bidet is stopped 1020.

Interactive Projection On Hand Description

The Pico interactive projector 902 made by the Pico company, or a Epsom projector made by the Epson company, or A Light Blue Optics projector made by the Light Blue Optics company, connects to a Satis toilet 912 by a wire (not shown). The wire is inside a flexible hose 908 that supports the Pico 902, illustrated in FIG. 16. The Pico 902 can maneuver and be positioned, to a position that the user 914 desires. The hose 902 is a flexible and ridged hose, and will stay in the position that the Pico is moved to, as shown in FIG. 16. The toilet 912 has a bidet (not shown). The Interactive Pico 902 connects to a Toshiba computer (not shown) inside the toilet 912. The projector 902 recognises shadows created by hand gestures in front of the projector 902. The hand gestures can choose displayed up or down seat 267 and lid 265 options, and a variety of other toilet devices.

The touch free user input device means, is the Pico touch free interactive projector 902, Pico eye 902 software and Microsoft operating system software, Android operating system software, and the Satis toilet Application software 902.

Interactive Projection On Hand Operation

The Pico projects 902 an interactive menu 918 of displayed toilet device function images icons 918 on to a surface 914, as shown in FIG. 16. The user 914 activates a chosen toilet function icon 916 by gesturing, touching above the projected icon 916 on a surface 914, such as touching above the bottom dryer icon 916. The surface may be a hand 914 or other desired surface, such as a magazine, a wall, etc. The projection zone 904 is flexible. The hand 914 can act as a white board, for projecting the menu of toilet functions on.

The user 914 can activate the projected icons by tapping their finger above the projected icon without touching the surface 914, such as the icons projected on the user's hand 914. The user uses the touch free user interactive projected display, to active the toilet device touch freely. The user 914 can also activate the icons by touching the icon on the surface.

The computer associates the activation of the icon, with instructions for the activation of the chosen device function. The computer sends the device function activation request to the toilet 912. The toilet 912 activates the toilet functions. The user 914 can stop the toilet functions 918 by pressing the stop button 910, or the device can stop automatically at the end of the device's cycle. The user can connect to the internet by touching the internet icon button 906.

Body Gesture Recognition Description

An all in one computer made by the Lenovo Company 552 has a microphone 556 and a speaker 558. In FIGS. 17 and 18, the computer 552 can be programmed with software from the Eyesight company of Israel, or programmed with Intel perceptual computing gesture recognition software 552 made by the Intel company, of Santa Clara, Calif., A Intel Perpetual computing software developer's kit SDK, or Microsoft Kinect for windows software, can be used to create the software for the hand, body, facial, and tongue gesture recognition software, recognition software, etc. The computer is programmed with Satis toilet operating software 552. The computer 552 is programmed with Windows 8 operating software 552.

The camera can be an Intel perceptual computing camera sensor 548 or a Microsoft Kinect for windows camera sensor. With the Intel camera, user gesture interaction zone 554 extends from around 20 centimeters to about 1 meter from the front of the Intel camera 548. The computer 552 is connected to the camera 548 by wire; the camera 548 faces the bathroom user area. The computer 552 is connected to the smart toilet 566 by wire using a wire or wireless WIFI connection. The computer 552 can connect to the internet using a wired or wireless WIFI connection. The display 550 can show internet TV. The computer 552 has a memory for data storage. The menu of pictograph gesture prompts 550 can be shown on the display screen 550 or on printed display pictographs (not shown). The Tobii, eye tracker and eye tracking sensors 574 attach to the computer 552. The computer 552 is programmed with Tobii eye tracking software 552. The computer has a microphone 556 and a speaker 558.

Body Gesture Recognition Operation

In FIGS. 17 and 18, a user 572 views the displayed 550 hand gestures and body part gestures that are associated with various toilet device functions. The user 572 chooses a toilet device function and preforms the hand gesture or body gesture associated with the toilet function within view of the camera 548. The user 572 shows their body part gestures and hand gestures, within view of the camera 548. The camera 548 sends the viewed hand gesture images to the computer 552. The computer 552 programmed-with hand gesture recognition software, associates the gesture received from the camera with stored gestures information. The stored gestures may be associated with instructions or requests for the activation of the device. The instructions are sent to the toilet. The toilet activates and deactivates the chosen toilet devices functions. When the toilet function is chosen, the chosen gesture icon is highlighted. The icon highlight turns off when the device deactivates.

The internet can be activated using the internet actuation gesture. For example the user wants to activate the front wash bidet, the user gives a thumbs up gesture to raise the lid, the lid up Icon illuminates, when the lid' reaches the up position the lid icon turns off, while seated on the toilet the user gives a finger up to activate the front wash the front wash icon illuminates the bidet cycles through A front wash cycle the front wash icon illuminates The user can add gestures to and change the association of gestures with the toilet devices. To change associated gestures and devices, the use can access, the 'change the gesture associations edit menu', by gesture activating the edit button (not shown)

The user activates the bottom air dryer 520 by following the stick out tongue icon 518 and sticking out their tongue within view of the camera 548. The user activates the toilet seat heater 512 by following the smiley face icon 518, and smiling 572 in view of the camera 548. The user activates the stop button 508 by following the hand in a fist with thumb sticking out icon 510, and gesturing a hand in a fist with thumb sticking out 572 in view of the camera 548. The user activates the front wash bidet icon 536 by following the one finger up icon 530, and raising one finger up 572 in view of the camera 548, Activating the front wash bidet icon 536, activates the front wash bidet 562, The user activates the back wash bidet icon 538, by following the two fingers up icon 540, and raising two fingers up 572 in view of the camera 548. The user can activate the increase or decrease bidet water spray pressure icon 506, by following the associated eye looking up icon 504, and looking up to increased spray water pressure, or looking down to decrease spray water pressure in view of the eye tracker 574. The user 572 activates the lid up icon 528 by following the fist with thumb up icon 526, and making a fist with thumb up in view of the camera 548. The user 572 activates the seat up icon 527 by following the two fingers pointed out horizontally icon 525, and making the two fingers pointed out horizontally gesture in view of the camera 548. The user 572 can lower the seat 570 by repeating the thumbs down hand gesture (not numbered).

The user 572 activates the back body profile gesture associated with putting the lid in the up position with the seat in the down position icon 528, by following the user show back to camera icon 541, and the user showing their back body profile to the camera 548. The user activates the front body profile gesture, associated with putting the lid in the up position with the seat in the down position icon 527, by following the user show front to camera icon 543, and the user showing their front body profile to camera 548. The computer identifies a user's front by identifying that the user's face is facing the camera, or identifying that the user's eyes are facing the eye tracker 574. The computer identifies the user's 574 back by identifying that the user's face is not facing the camera 548 or identifying that the eyes are not facing the eye tracker 574.

The user activates the internet connection which is displayed on an area of the display 550 computer by following the three fingers up with thumb and index finger making a circle hand sign icon 544 which is associated with the internet activation icon 542, and making the fingers up with thumb and index finger making a circle hand sign within view of the camera 548. When the user activates the internet, body gestures can be used to control internet browsing. Words are displayed which are associated with body gestures. The internet content can be viewed on an area of the display, sharing the display with the gesture icons, or a, browser page can fill the whole display screen (not shown)

A larger menu, with more illuminated internet commands of associated gesture icon can be accessed by the user by following the move eye up or down icon 504 associated with the illuminated browser 502, by looking up within view of the eye tracker 574 while in internet connection mode. The user can click on the location where the pointer is by following the fist with thumb sticking out icons 510 associated with the illuminated click 509.

The user 572 can scroll up or down on a displayed web page or document by following the extend out tongue icon 514 associated with the illuminated scroll lettering 516 and extending their tongue out and down to Scholl down, or extending their tongue up and out to scroll up in view of the camera.

The user can activate the seat following icon 534, by following the hand back and forth movement icon 532, and moving their hand up and down with in view of the camera 548, the seat will move in synchronization with the closest user hand to the camera. If the user 572 movers their hand within view of the camera 548, the seat 570 will move up and vice versa. If the user stops moving their hand, the seat 570 will stop moving and stay in place, which could be in a middle position between up or down position, until the user continues moving their hand. When the seat 570 or lid 564 reaches the up or down position the seat 570 or lid 564 will stay in place until the seat 570 or lid 564 following button (not shown) is activated.

The hand gestures associated with toilet functions activation can used for to controlling internet browsing, and TV viewing, they can double, be switched for internet and TV use, the circle with three fingers up gesture actives the internet connecting browsing mode an internet browser web page appears. Using a thumbs up or thumbs down, a user 574 can scroll one webpage up or down; pages can be moved forward and back by moving their hand back and forth in front of the screen 550. A cursor (not shown) can be controlled by the pointing the fingers in the desired direction of the curser movement. The cursor movement speed in controlled by the opening and closing of the user's fingers. The cursor doesn't move when the fingers are closed, the cursor moves when the fingers open, the more the fingers move the faster the curser moves. For example the user points their right hand, diagonally up to the left and opens their finger, the cursor moves up and to the left on the display screen, this works for both left and right hands. The user closes their fingers when the cursor has reached the desired location the use closes their hand to click. When the cursor is at on the desired cursor location, the user opens and closes their hand, twice to double click the cursor.

The user can access a virtual keyboard (not shown) using the cursor and enter letters and numbers using the cursor. A user can program their own gestures to be associated with function operations. The user can change the gestures that are associated with toilet functions. Sign language hand gestures could be programmed in to the system.

The touch free user body gesture recognition input device means, is the Intel perceptual computing camera sensor 548, Intel perceptual computing gesture recognition software 552 the Tobii, eye tracker, eye tracking sensors 574, eye tracking sensors, Tobii eye 602 software, Microsoft operating system software, and Satis toilet application software.

Figure 9:
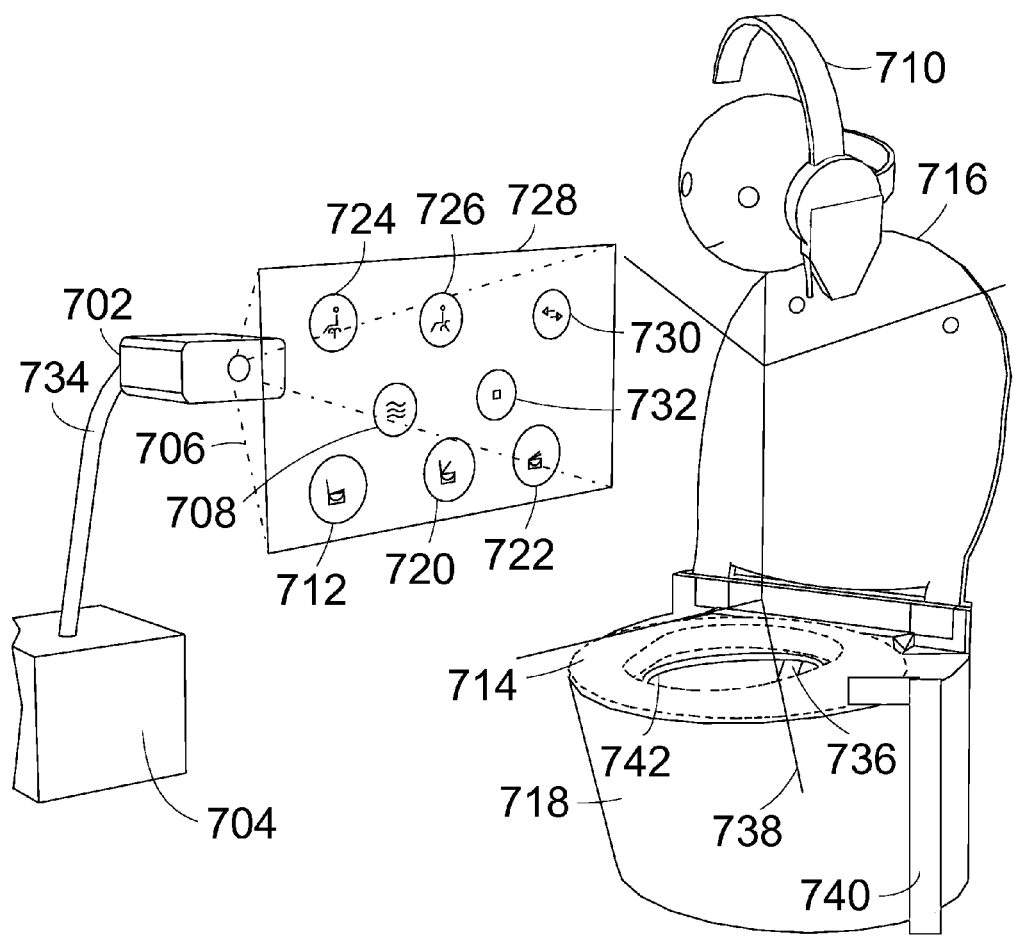
FIG. 9 is a top left front perspective view of a levitation toilet seat, 102 holographic touch free display, and a Neurosky thought input headset and the smart toilet.

A Holographic Touch Free Display and Brain Wave Controlled User Levitation Toilet Seat Description A Heliodisplay holographic interactive projector 720, made by the IO2 Technology Company, connects to a Toshiba desktop computer 704. The computer is inside a housing 704. The projector 720 is water proofed. The projector 720 is attached to a position adjustable flexible support hose 734, as shown in FIG. 9. The hose 734, a microphone and speaker (not shown) are attached to the housing 704. The computer connects to a user levitating toilet 718 by wire.

The holographic projector 720 projects into space, free air, the projection zone 706 are about 5 meters in front of the projector 702. The images are projected onto a mist of water droplets. The holographic images position and distance from the assembly can be adjusted by a user 738. The flexible hose 734, allows the user to move the projector 240 to a preferred location, as shown in FIG. 9. The holographic projected display 728 shows a menu of toilet device functions.

A Neurosky brain wave and thought monitoring headset 710, can use thoughts to activate the toilet function icons 286. The headset wirelessly signals the computer to operate a displayed toilet function icon. The thoughts are associated with displayed toilet device function icons. The thoughts are associated with certain brain waves; the certain brain waves are associated with commands for the displayed toilet devices.

Various types of forces can be used to levitate a user sitting on the levitation toilet 718, in FIG. 9, such as aerodynamic, magnetic, acoustic, electromagnetic, electrostatic, and gas film, etc. Lasers, superconducting magnets, ultra sonic sound waves singularly or a combination of energy sources 740 could be used to levitate a user. Lasers, superconducting magnets, ultra sonic sound waves 742 are placed around the toilet bowel 718 directing the levitating force 714 upward from the toilet bowel 718. An energy generator 740 supplies power to the various levitating devices, connected to the energy supply ring 742. The levitating forces form a boundary between the toilet bowel 718 and the sitting user 738, separating the user 738 from physical contact with the toilet bowel 718, as illustrated in FIG. 9. A bidet 736 is incorporated into the toilet 718.

The touch free levitation field 714 between the toilet bowel 718 and the user 738, keeps the user 738 from contacting the toilet bowel 718 when sitting on the toilet seat 714 as shown in FIG. 9. The user 738 sits on the levitating field 714, the field 714 acts as the toilet seat 714, and is the toilet seat 714. Lasers, superconducting magnets, ultra sonic sound waves, singularly or a combination of the energy sources are used to levitate a user 738 above the toilet bowel 718. The levitation field acts as a levitating toilet seat 714, the field is doughnut shaped 714.

The energy field 714 is bacterial and contaminate free when initially activated. When the energy field 714 is deactivated, contaminates and bacteria and guided into the toilet bowel 702. The levitation field 708 is comfortable and supportive for the user 712. The system senses when a user 712 is sitting on the seat 714, and won't deactivate when the seat is occupied.

A Holographic Touch Free Display and Brain Wave Controlled User Levitation Toilet Seat Description Operation The user 738 touches one of the holographic toilet function menu icons, which will change the color of the icon, shown in FIG. 9. The user 738 touches the changed color icon a second time to activate the toilet function icon. The icon will change color again to show that the toilet device has been activated.

The user 738 thinks of the desired toilet function icon, the icon will brighten or change to a different color showing icon has been clicked. The clicked icon may change color, such as, from a blue color to an orange color. The user 738 gives the yes command by smiling; the yes command is associated smiling muscle brain waves. The changed color icon is given a yes command by the smiling user 738 to activate the toilet function, double clicking the icon. The icon will change color again, such as changing color for orange to yellow, to show that the toilet device has been activated.

A user 738 wearing the Neurosky headset 710 on their head, and thinks seat 716 up and the seat up icon 720 luminosity brightens. The user thinks 'yes', the seat up icon 720 is activated, the seat 716 moves up.

The user can use the headset and the display together to control the toilet devices. Such as, the user moves their tongue and the electrical brain signals associated with moving their tongue will increase the luminosity of the bidet front wash icon 724. The user touches the displayed, bidet front wash icon with their finger, the bidet front wash activates.

The user can control a variety of devices, by interacting with the display icons, levitation seat activation and lid to up position icon 712, levitation seat deactivation and lid to down position icon 722, levitation seat deactivation icon 720, bidet front wash icon 724, bidet back wash icon 726, bidet back and forth mover icon 730, toilet flush icon 708 and stop button icon 732.

The energy field seat 708 is created, activated or turned on when a user 738 activates the levitation icon 712 on the energy field 708. The icon can be activated by the user 738, 738 touching the icon or thought activating the icon. The seat can be turned off by activating the stop button. When the user 712 vacates the toilet seat 702 the levitation field 708 turns off, any bacteria or body fluids left on the seat 708 falls into the toilet 702.

The touch free user input device means, is the touch sensitive holographic projector 720, touch sensitive holographic projector software 704, brain wave and thought monitoring headset 710 brain wave and thought monitoring headset software 704 Microsoft operating system software 704, and the user levitation field 714.

Figure 11:
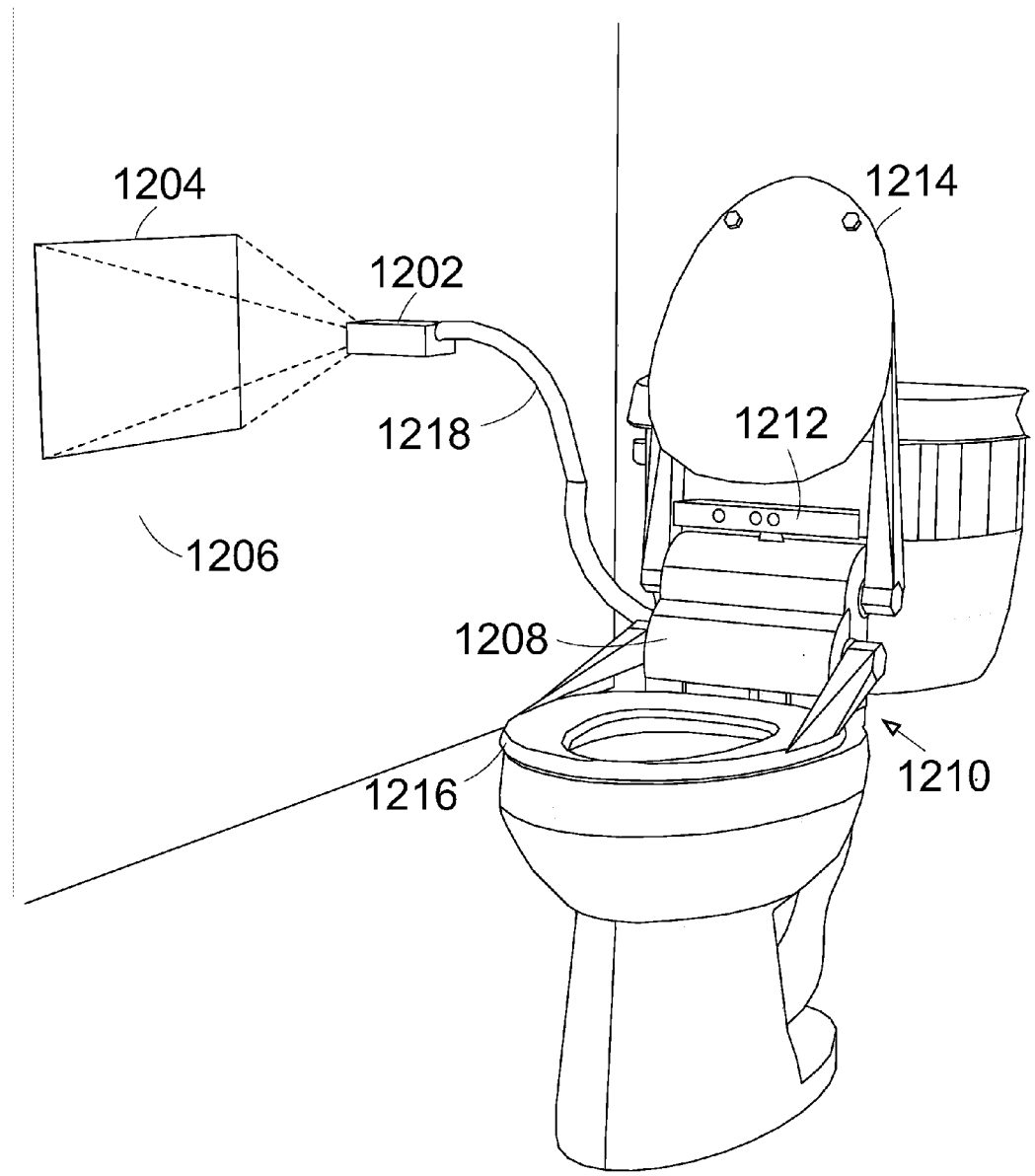
FIG. 11 is a front right side perspective view of a Kinect avatar projector display.

Kinect Motion Avatar Interactive Display Projected on to a Surface Hand Controlling Avatar Pointer Description A Pico projector 1202 is attached to a flexible support hose 1218, in FIG. 11. The flexible hose 1218 is connected to the assembly 1210. There are flexible hose plugs for the projector (not shown), on the right side and left side of the assembly 1210 The Pico Projector 1202 is connected to the computer 1208. The Pico project 1202 is connected to the computer 1208, by a flexible, adjustable hose 1218, as shown in 19. The Kinect motion sensing device 1212 is connected to the computer 1208. The computer connects to a motor controller (not shown), the motor controller connects to a seat motor (not shown), and a lid motor (not shown), inside the housing 1208. The assembly 1210 includes the Kinect sensor 1212, the projector 1202, the computer inside the housing 1208, the toilet seat 1216, the lid 1214, and the flexible support hose 1218, the motor controller (not shown), the seat and lid motors (not shown).

Kinect Motion Avatar Interactive Display Projected On To A Surface, Hand Controlling Avatar Pointer Operation The user interacts with the displayed options 1204 by moving their hand in front of, in view of the Kinect sensor 1212 which moves a pointer or avatar on the projected display 1204 The user controls, chooses seat 1216 up or seat 1216 down, and lid 1214 up or lid 1214 down, and menu options by positioning the pointer over the desired menu option 1204, and flexing their hand in a forward motion, the menu option is clicked and picked, as illustrated in FIG. 11. The user can choose different avatars and body gestures to choose the menu options. The display 1204 can be projected on many possible surfaces such as a wall 1206 or floor surface. The display 1204 can be moved, by adjusting the projector 1202, which is attached to the flexible support hose 1218. The projector 1202 can be plugged into either the left side or the right side, of the assembly. Messages and pictures can be displayed 1204. Voice recognition, internet browsing and internet video images can be displayed 1204 and sound broadcast.

Conclusions, Ramifications and Scope

CONCLUSION: Although the description above contains much specificity, these should not be construed as limiting the scope of the embodiments but as merely providing illustrations of some of the presently preferred embodiments. For example the seat can have different shapes, such as, a toilet seat with a notch in the front; the bidet could also spay water mixed with cleaning solutions, perfumed smelling solutions, the toilet control panel could use a plurality of touch free infrared activation buttons. An anti-microbial toilet seat and lid coating the seat being u shaped. Ultraviolet Light Emitting Diodes (UV LED) may be attached to the housing, radiating, the toilet seat, toilet bowel, and toilet water, to disinfect their surfaces. The holographic projector may use haptic feedback, holographic touch feedback. A 2D and 3D volumetric display technology may be used for the free air display, made by various companies, Holografika Company, Sharp Electronics Company, and 3D Icon Company. Ultra sonic sound wave's Doppler Effect can be used, for gesture recognition. Rotary potentiometers and optical encoders maybe used, to sense the rotation and position of the seat or lid. The toilet seat assembly may be made out of water resistant high strength plastic, wood, metal, rubber, and the like.

While the foregoing written description of the embodiments enables one of ordinary skill to make and use what is considered presently to be the best mode thereof, those of ordinary skill will understand and appreciate the existence of variations, combinations, and equivalents of the specific embodiment, method, and examples herein. The embodiments should therefore not be limited by the above described embodiments, method, and examples, but by all embodiments and methods within the scope and spirit of the embodiments.

Thus the scope of the embodiments should be determined by the appended claims and their legal equivalents rather than by the examples given. Thus the reader will see that at least one embodiment of the touch free toilet panel control assembly provides a more reliable, healthier and economical device that can be used by persons of almost any age. It will be apparent that various changes and modifications can be made without departing from the scope of the various embodiments as defined in the claims. Although the embodiments have been described in connection with various embodiments, it should be understood that various modifications, additions and alteration may be made to the embodiment by one skilled in the art without departing from the spirit and scope of the embodiments as defined in the appended claims.

Patent Application of sigmund lindsay clements for, A Touch Free Hygienic Control Panel Display For A Smart Toilet, 'Address 4822 rue de la Peltrie, montreal, Quebec, H3W 1K5, Canada, 514-733-2773

I claim:
1. An eye tracking device connected to a computer, the computer connected to a display, comprising:
   a bidet connected to the computer, and the computer having a software,
   the bidet positioned in a toilet,
   for the bidet to spray water on the user's front, or back position, while the user sits on the toilet,
   the display is a computer-generated display,
   the display shows an increase icon, a decrease icon, a back wash icon, and a front wash icon,
   for the user to gaze at the increase icon, or the decrease icon, or the back wash icon, or the front wash icon,
   the eye tracking device configured to detect a user's eyes gaze, at the increase icon, or the decrease icon, or the back wash icon, or the front wash icon, an association between a detection of the user's eye gaze at the increase icon, or the decrease icon, or the back wash icon, or the front wash icon, to an activation of the icon being gazed at, for the detection of the gaze at the increase icon, or the decrease icon, or the back wash icon, or the front wash icon, to activate the icon detected being gazed at, the bidet having a increase water heater, a decrease water heater, a water sprayer, and the water sprayer positioned, to spray water on the user's front position, or back position, an association between an activation of the increase icon, to an activation of the increase water heater of the bidet, for the activation of the increase water heater, to increase the temperature of the water sprayed from the water sprayer, an association between an activation of the temperature decrease icon, to an activation of the decrease water heater, for the activation of the decrease water heater, to decrease the temperature of the water sprayed from the water sprayer, an association between an activation of the back wash icon, to an activation of the water sprayer, positioned to spray water on the user's back position, for the activation of the water sprayer, positioned to spray water on the user's back position, to spray water on the user's back position, an association between an activation of the front wash icon, to an activation of the water sprayer positioned, to spray water on the user's front position, for the activation of the water sprayer, positioned to spray water on the user's front position, to spray water on the user's front position, whereby the user can avoid touching bacteria, by using eye gaze to increase, or decrease the temperature of the water spraying from the bidet, on the user's front, or back position.

2. The eye tracking device of claim 1, further including a water pressure increase icon displayed on the display, further including the eye tracking device configured to detect, the user's eyes gaze at the water pressure increase icon, further including an association between a detection of the user's eye gaze at the water pressure increase icon, to an activation of the water pressure increase icon, further including the bidet a having a water pump, further including an association between an activation of the water increase icon and an activation of the water pump, further including an association between the activation of the water pump and an increase of a water pressure of the water sprayed from the bidet.

3. The eye tracking device of claim 1, further including a water aeration icon displayed on the display, further including the eye tracking device configured to detect, the user's eyes gaze at the water aeration icon, further including an association between a detection of the user's eye gaze at the water aeration icon to an activation of the water aeration icon, further including the bidet a having a water aerator, further including an association between an activation of the water aeration icon, being associated to an activation of the water aerator, further including an association between the activation of the water aerator to an increase in an aeration of the water sprayed from the bidet.

4. The eye tracking device of claim 1, further including a cursor displayed on the display, further including the eye tracker device configured to detect, the user's eye gaze's location on the display, further including an association to the cursor's location on the display to the location of the user's gaze location on the display, further including the cursor's location on the display being near to the location of the user's gaze location on the display, for the cursor's location to relocate near the user's gaze location on the display.

5. The eye tracking device of claim 1, further including a correspondence between the icon that the user's gaze is detected gazing at, and a highlighting of the icon that the user's gaze is detected gazing at, for the highlighting of the icon to let the user view the icon the user is detected gazing at.

6. An eye tracking device is connected to a computer, the computer is connected to a bidet, comprising:

a display screen is connected to the computer, and the computer having a software, the display screen shows a plurality of icons, and one or more of the plurality of icons can be activated, the eye tracking device configured to detect, a gaze of a user's eyes at one of the plurality of icons, a correspondence between a detection of the user's eye gaze at one of the plurality of icons, to an activation of the icon detected being gazed at, the bidet having a plurality of operations, a correspondence between the activation of one of the plurality of icons, to an activation of one of the plurality of operations of the bidet, one or more of the plurality of icons showing a description of one or more of the plurality of operations of the bidet, that is activated, by an activation of the one or more of the plurality of icons, the bidet is part of a toilet, the bidet having a back water sprayer, and the back water sprayer is positioned to spray water on the back position, of the user's posterior, while the user sits on the toilet, the bidet having a front water sprayer, and the front water sprayer is positioned, to spray water on the user's genitals, wherein one of the plurality of icons shows a back wash icon, a correspondence between the activation of the back wash icon, to the activation of the back water sprayer, a correspondence between the activation of the back wash sprayer, to the back wash sprayer spraying water on the back position, wherein one of the plurality of icons shows a front wash icon, a correspondence between the activation of the front wash icon, to the activation of the front water sprayer, a correspondence between the activation of the front wash sprayer, to the front wash sprayer spraying water on the genitals of the user, the bidet having a water heater, wherein one of the plurality of icons shows an increase icon, a correspondence between the activation of the increase icon to, an activation of an increase operation of the water heater, a correspondence between the activation of the increase operation of the water heater, to a temperate increase of the water sprayed from the bidet, wherein one of the plurality of icons shows a decrease icon, a correspondence between the activation of the decrease icon, to an activation of a decrease operation of the water heater, a correspondence between the activation of the decrease operation of the water heater, to a temperate decrease of the water sprayed from the bidet, whereby the user can use eye gaze, to touch freely activate one or more operations of the bidet, and avoid touching possibly harmful bacteria while operating the bidet.

7. The computer connected to a bidet of claim 6, wherein one of the plurality of icons is a water pressure increase icon,
   further including a water pump in the bidet,
   further including a correspondence between an activation of the water increase icon, and an activation of the water pump,
   further including a correspondence between the activation of the water pump, and an increase of a water pressure of the water sprayed from the bidet.

8. The computer connected to a bidet of claim 6, wherein one of the plurality of icons is a water aeration icon,
   further including a water aerator in the bidet,
   further including a correspondence between an activation of the water aeration icon, and an activation of the water aerator,
   further including a correspondence between the activation of the water aerator, and an increase in an aeration of the water sprayed from the bidet.

9. The computer connected to a bidet of claim 6, further including a cursor displayed on the display,
   further including the eye tracker device configured to detect, the user's eye gaze's location on the display,
   further including a correspondence to the cursor's location on the display, to the location of the user's gaze location on the display,
   further including the cursor's location on the display, being near to the location of the user's gaze location on the display.

10. The computer connected to a bidet of claim 6, further including a correspondence between the icon that the user's gaze is detected gazing at, and a highlighting of the icon that the user's gaze is detected gazing at.

11. A method for a user's eye gaze to sanitarily operate a bidet, comprising:
    displaying icons,
        by the icons comprising: a plurality of icons, a water temperature increase icon, a water temperature decrease icon, a back wash icon, and a front wash icon,
        by displaying the icons on a display screen, and the display screen connected to a computer, and the computer having a software,
        by the bidet having a plurality of operations,
        by one or more of the icons showing one or more of the plurality of operations of the bidet, that an activation of the one or more icons is associated to activating,
    detecting the user's eye gaze at one of the icons,
        by an eye tracking device configured to detect, the user's gaze at one of the icons,
        by the eye tracking device comprising: an eye tracker connected to the computer, the computer having an eye tracker software, and the display screen,
    activating the icon that is, detected, being gazed at,
        by the detection of the icon being gazed at, being associated to the activation of the icon being gazed at,
    activating one of the operations of the bidet associated to the activation of the icon,
        by the activation of the icon, being associated to the activation of one of the operations of the bidet,
        by an activation of the water temperature increase icon, being associated to activating an increase operation of a water heater in the bidet,
        by an activation of the water temperature decrease icon, being associated to activating a decrease operation of the water heater,
        by an activation of the back wash icon, being associated to activating a back wash operation of a water sprayer in the bidet,
        by an activation of the front wash icon, being associated to activating a front wash operation of the water sprayer,
    implementing the activated operation of the bidet,
        by the bidet performing the activated operation of the bidet,
        by the bidet connected to the computer,
    spraying water on the user's front, or back position of the user's posterior,
        by the bidet positioned in a toilet, to spray water on the user's front, or back position,
        by the activation of the back wash operation of the water sprayer, being associated to the water sprayer spraying water on the user's back position,
        by the activation of the front wash operation of the water sprayer, being associated to the water sprayer spraying water on the user's front position,
    increasing, or decreasing a temperature of the water sprayed from the bidet,
        by the activation of the increase operation of the water heater, being associated to an increase of the temperature of the water being sprayed from the water sprayer,
        or by the activation of the decrease operation of the water heater, being associated to a decrease of the temperature of the water being sprayed from the water sprayer,
    whereby the user can avoid touching bacteria, while operating the bidet, by using eye gaze to activate, one or more of the operations of the bidet.

12. The method of claim 11, wherein one of the plurality of icons is a water pressure increase icon,
    further providing the bidet a having a water pump,
    further providing an association between an activation of the water increase icon to an activation of the water pump,
    further providing an association between the activation of the water pump to an increase of a water pressure of the water sprayed from the bidet.

13. The method of claim 11, wherein one of the plurality of icons is a water aeration icon,
    further providing the bidet a having a water aerator,
    further providing an activation of the water aeration icon, being associated to an activation of the water aerator,
    further providing the activation of the water aerator being associated to an increase of an aeration of the water sprayed from the bidet.

14. The method of claim 11, further providing a cursor displayed on the display, further providing the eye tracker device configured to detect, the user's eye gaze's location on the display, further providing the cursor's location on the display being near the location of the user's gaze location on the display.

15. The method of claim 11, further including highlighting the icon that the user's gaze is detected gazing at.

16. The method of claim 11, wherein one of the plurality of icons is a water aeration icon, further providing the bidet a having a water aerator, further providing an activation of the water aeration icon, being associated to an activation of the water aerator, further providing the activation of the water aerator being associated to increasing an aeration of the water sprayed from the bidet, wherein one of the plurality of icons is a water pressure increase icon, further providing the bidet a having a water pump, further providing an activation of the water increase icon being associated to an activation of the water pump, further providing the activation of the water pump being associated to increasing a water pressure of the water sprayed from the bidet, further including highlighting the icon that the user is detected gazing at, for the highlighting of the icon to let the user view which icon the user is gazing at, further providing a cursor displayed on the display, further providing the eye tracker device configured to detect, the user's eye gaze's location on the display, further providing an association to the cursor's location on the display to the location of the user's gaze location on the display, further providing the cursor's location on the display being near the location of the user's gaze location on the display.

* * * * *